United States Patent [19]

Saxe

[11] Patent Number: 5,631,908

[45] Date of Patent: May 20, 1997

[54] METHOD AND APPARATUS FOR GENERATING AND IMPLEMENTING SMOOTH SCHEDULES FOR FORWARDING DATA FLOWS ACROSS CELL-BASED SWITCHES

[75] Inventor: James B. Saxe, Palo Alto, Calif.

[73] Assignee: Digital Equipment Corporation, Maynard, Mass.

[21] Appl. No.: 412,395

[22] Filed: Mar. 28, 1995

[51] Int. Cl.$^6$ ........................................ H04J 3/02
[52] U.S. Cl. .................. 370/235; 370/398; 370/468
[58] Field of Search ........................ 370/58.2, 58.1, 370/58.3, 60.1, 60, 54, 94.1, 17, 68.1, 85.7, 94.2, 65.5; 395/311; 340/825.79

[56] References Cited

U.S. PATENT DOCUMENTS

| | | | |
|---|---|---|---|
| 4,630,045 | 12/1986 | Georgiou | 340/825.79 |
| 5,072,366 | 12/1991 | Simcoe | 395/200 |
| 5,255,265 | 10/1993 | Eng et al. | 370/60 |
| 5,267,235 | 11/1993 | Thacker | 370/60 |
| 5,301,055 | 4/1994 | Bagchi et al. | 370/60.1 |
| 5,499,238 | 3/1996 | Shon | 370/60.1 |
| 5,500,858 | 3/1996 | McKeown | 370/60 |
| 5,515,363 | 5/1996 | Ben-Nun et al. | 370/60.1 |
| 5,517,495 | 5/1996 | Lund et al. | 370/60 |

OTHER PUBLICATIONS

Lane, James, "ATM Knits Voice, Data On Any Net," IEEE Spectrum, Feb. 1994, pp. 42–45.

Anderson, T., et al, "High Speed Switch Scheduling for Local Area Networks," International Conference on ASPLOS, vol. 27, No. 9, Sep. 1992, pp. 1–13.

Ramakrishnan, K.K., "Performance Considerations In Designing Network Interfaces," IEEE Journal On Selected Areas in Communications, vol. 11, No. 2, Feb. 1993, pp. 203–219.

Hui, J., et al, "A Broadband Packet Switch for Integrated Transport," IEEE Journal on Selected Areas In COmmunications, vol. SAC-5, No. 8, Oct. 1987, pp. 1264–1273.

Rooholamini, R., et al, "Finding the Right ATM Switch for the Market," IEEE Computer Society, Apr. 1994, pp. 16–28.

Anderson, T., et al, "High Speed Switch Scheduling for Local Area Networks," Digital Systems Research Center, Apr. 26, 1993, pp. 1–37.

Benes, V.E., "On Rearrangeable Three-Stage Connecting Networks," The Bell System Technical Journal, vol. XLI, No. 5, Sep. 1962.

Miller, A., "From Here to ATM," IEEE Spectrum, Special Report: Communications, Jun. 1994, pp. 20–24.

Ruiu, Dragos, "Testing ATM Systems," IEEE Spectrum, Special Report: Communications, Jun. 1994, pp. 25–27.

*Primary Examiner*—Wellington Chin
*Assistant Examiner*—Huy D. Vu
*Attorney, Agent, or Firm*—Kenneth F. Kozik

[57] ABSTRACT

A method and apparatus is provided for generating and implementing a "smooth" schedule for forwarding of cells across a switch in a communication network, such as an ATM network. The schedule is obtained by recursively dividing bandwidth requests into nearly equal subrequests, and selectively allocating the subrequests to slots of a frame in a manner that obtains approximately uniform temporal distribution of cell forwarding over the duration of the frame. Implementation of such a schedule can eliminate clustering of cell forwarding across the switch, thereby reducing latency and space requirements for input and output buffering.

20 Claims, 9 Drawing Sheets

| FLOW ID | INPUT PORT | OUTPUT PORT | BANDWIDTH |
|---|---|---|---|
| f1 | 1 | 1 | 9 |
| f2 | 1 | 2 | 1 |
| f3 | 1 | 3 | 11 |
| f4 | 1 | 4 | 6 |
| f5 | 2 | 1 | 5 |
| f6 | 2 | 2 | 15 |
| f7 | 2 | 3 | 11 |
| f8 | 3 | 1 | 13 |
| f9 | 3 | 1 | 5 |
| f10 | 3 | 3 | 9 |
| f11 | 3 | 4 | 2 |
| f12 | 4 | 4 | 3 |
| f13 | 4 | 4 | 15 |
| f14 | 4 | 4 | 3 |

| INPUT PAIRING IP | 1 | 2 | 2 | 3 | 3 | 1 | 2 | 3 | 3 | 4 | 4 |
|---|---|---|---|---|---|---|---|---|---|---|---|
| INPUT PORT # | 1 | 2 | 2 | 3 | 3 | 1 | 2 | 3 | 3 | 4 | 4 |
| FLOW ID | f1 | f2 | f6 | f5 | f8 | f9 | f3 | f7 | f10 | f12 | f13 | f14 |
| OUTPUT PORT # | 1 | 2 | 2 | 1 | 1 | 1 | 3 | 3 | 3 | 4 | 4 | 4 |
| OUTPUT PAIRING OP | 1 | 2 | 2 | 1 | 1 | 1 | 3 | 3 | 3 | 4 | 4 | 4 |

FIGURE 10

| INPUT PAIRING IP | 1 | 2 | 2 | 3 | 3 | 1 | 2 | 3 | 3 | 4 | 4 |
|---|---|---|---|---|---|---|---|---|---|---|---|
| INPUT PORT # | 1 | 2 | 2 | 3 | 3 | 1 | 2 | 3 | 3 | 4 | 4 |
| FLOW ID | f1 | f2 | f6 | f5 | f8 | f9 | f3 | f7 | f10 | f12 | f13 | f14 |
| OUTPUT PORT # | 1 | 2 | 2 | 1 | 1 | 1 | 3 | 3 | 3 | 4 | 4 | 4 |
| OUTPUT PAIRING OP | 1 | 2 | 2 | 1 | 1 | 1 | 3 | 3 | 3 | 4 | 4 | 4 |

| B1: FLOW ID | INPUT PORT | OUTPUT PORT | BANDWIDTH |
|---|---|---|---|
| f4  | 1 | 4 | 6/2 = 3 |
| f11 | 3 | 4 | 2/2 = 1 |
| f1  | 1 | 1 | (9+1)/2 = 5 |
| f6  | 2 | 2 | (15+1)/2 = 8 |
| f8  | 3 | 1 | (13+1)/2 = 7 |
| f3  | 1 | 3 | (11+1)/2 = 6 |
| f10 | 3 | 3 | (9+1)/2 = 5 |
| f13 | 4 | 4 | (15+1)/2 = 8 |
| f2  | 1 | 2 | (1-1)/2 = 0 |
| f5  | 2 | 1 | (5-1)/2 = 2 |
| f9  | 3 | 1 | (5-1)/2 = 2 |
| f7  | 2 | 3 | (11-1)/2 = 5 |
| f12 | 3 | 4 | (3-1)/2 = 1 |
| f14 | 4 | 4 | (3-1)/2 = 1 |

| B2: FLOW ID | INPUT PORT | OUTPUT PORT | BANDWIDTH |
|---|---|---|---|
| f4  | 1 | 4 | 6/2 = 3 |
| f11 | 3 | 4 | 2/2 = 1 |
| f1  | 1 | 1 | (9-1)/2 = 4 |
| f6  | 2 | 2 | (15-1)/2 = 7 |
| f8  | 3 | 1 | (13-1)/2 = 6 |
| f3  | 1 | 3 | (11-1)/2 = 5 |
| f10 | 3 | 3 | (9-1)/2 = 4 |
| f13 | 4 | 4 | (15-1)/2 = 7 |
| f2  | 1 | 2 | (1+1)/2 = 1 |
| f5  | 2 | 1 | (5+1)/2 = 3 |
| f9  | 3 | 1 | (5+1)/2 = 3 |
| f7  | 2 | 3 | (11+1)/2 = 6 |
| f12 | 3 | 4 | (3+1)/2 = 4 |
| f14 | 4 | 4 | (3+1)/2 = 2 |

FIGURE 9

METHOD AND APPARATUS FOR GENERATING AND IMPLEMENTING SMOOTH SCHEDULES FOR FORWARDING DATA FLOWS ACROSS CELL-BASED SWITCHES

FIELD OF THE INVENTION

This invention relates generally to the fields of communication and distributed computing, and more particularly to switching systems of voice, video and data communication networks. The invention finds particular utility in switching systems complying with the point-to-point network protocol referred to by the acronym, "ATM," or other cell-based protocols.

BACKGROUND OF THE INVENTION (a) ATM Networks

"ATM" stands for asynchronous transfer mode, and is a specific type of digital packet-switching technology. Unlike other, packet-switching protocols that use variable-length packets, ATM uses short, fixed-length cells. Each cell has a standard length of 53 bytes (each byte having eight bits), and is formatted to include a 5-byte header specifying (directly or indirectly) a destination address and a 48-byte information field or "payload."

An ATM network typically incorporates a number of stations called "hosts" that can originate and transmit cells, and a number of switching systems that interconnect the hosts. Examples of possible hosts include user work stations, dedicated servers, and even computers that act as bridges to other networks. When a host originates cells, it transmits them over a dedicated communication link to one of the switching systems, which forwards the received cells over a number of communication links to a destination host, often via a number of other intermediate switching systems.

An ATM network is connection oriented in that traffic is forwarded along an end-to-end path between the source and destination of the cells, called a virtual circuit, which is established before cell transfer can start. The circuit is called "virtual" because the connections that form it are specified in forwarding tables stored in the switching systems of the network, and can be changed simply by updating the stored data. During cell forwarding, the switching systems access the forwarding tables using destination addresses contained in headers of newly arrived cells. Before sending the cells on the next legs of their journeys in accordance with the forwarding tables, the switching systems may overwrite the destination addresses contained in the cell headers with new addresses recognizable by the next switching systems along the virtual circuit as entries in their forwarding tables.

ATM switching systems typically include transceivers and high speed switches, typically based on matrix topology (such as crossbars), tree topology (such as Banyan networks), or bus topology. A point-to-point switch such as a crossbar has an internal network or fabric of conductors that interconnects multiple input ports (called "inputs") and multiple output ports (called "outputs"). The internal network can be dynamically configured to connect any of the inputs to any of the outputs, thus allowing simultaneous forwarding of cells across different input-output connections. This is sometimes called "space division switching."

Each ATM switching system performs a number of tasks which together constitute switching, namely, arbitration, switch set-up, and forwarding. ARBITRATION can be broadly defined as the process of choosing cells that are to be sent through the switch during any given time. SWITCH SET-UP is the process of generating signals for configuring the cross-bar switch, or other internal switching fabric, to connect appropriate inputs and outputs for cell forwarding thereacross. FORWARDING entails delivering cells across the established switch connections and to communication links that constitute the "next" connections in the virtual circuits for the cells. In order to improve the efficiency and/or effectiveness of arbitration, a switching system may also perform SCHEDULING, which is the process of computing, wholly or partially, the outcomes of future arbitration decisions, and storing the result of that computation (called a SCHEDULE) in memory devices. Later arbitration may be performed wholly or partially on the basis of the contents of the precomputed schedule.

ATM architecture is suited to the transmission needs of data, voice, video, graphics, and other real-time traffic. Of course, as the name implies, an ATM network does not provide a system-wide clock for providing fixed timing relationships for transmitted traffic. Nonetheless, ATM networks can provide service for multimedia applications in which video frames must be received for display at fixed intervals. Some ATM networks accomplish this by providing bounded latency for cell delivery.

(b) Bandwidth Requests and Cell Scheduling

Known ATM networks may achieve bounded latency by means of an admission control methodology under which switching systems accept and fulfill (or reject) advanced reservations of system bandwidth for such traffic. Traffic with reserved bandwidth requirements is described as constant bit rate (CBR), and other traffic as variable bit rate (VBR) or "datagrams." Switch systems distinguish VBR and CBR cells based on flow identifiers in the cell headers; the headers also identify the flow to which the cells belong. A flow is defined as a group of related cells having a common source and a common destination, and sharing a virtual circuit established by the ATM network. A number of different independent flows can exist from a given source to a given destination.

Typically, ATM switching systems use time-division switching, in which the same physical resources are used to handle flows at different times. To accomplish time-division switching, time during which the switch operates is divided into equal-length intervals, called slots. Each slot is of a duration sufficient to transmit a single cell from a switch input to a switch output, with switch reconfigurations occurring after every time slot, and only at slot boundaries. In known ATM systems, consecutive time slots are grouped into batches, called frames, each having the same size expressed in terms of number of slots, "N." Frame size is a characteristic parameter of a particular ATM switching system, and is internal to the switching system. For example, a frame can consist of 1024 slots. The slots of each frame have a predetermined order; in other words, the slots hold a predetermined position within a frame.

To "make" a bandwidth reservation, a host running, e.g., a multimedia application (or a communication routine thereof) requests a certain bandwidth and latency bound for a particular CBR flow. Each bandwidth request can be expressed in the form "flow f needs $m\_f$ cells per frame of bandwidth from input port number $i\_f$ to output port number $o\_f$." Accordingly, to meet the request, $m\_f$ slots in each frame must be reserved for flow f.

If the request can be met without violating any existing service guarantees, the ATM network grants the request and reserves the required resources on a virtual circuit for that flow; otherwise, the request is rejected. If the request is granted, the host station can then transmit cells at a rate up to the requested bandwidth, and the network ensures that the transmitted cells are delivered on time.

Switch time not utilized by CBR traffic can be used for transmitting VBR traffic, such as file transfers or remote procedure calls. If the ATM network becomes too heavily loaded, i.e., the number of cells within the network exceeds the level at which network performance degrades, VBR cells may suffer delays or even loss. On the other hand, the ATM network must assure that CBR performance guarantees are met to an acceptable level no matter how high the load of VBR traffic.

Since CBR traffic bandwidth (expressed as cells per frame) and latency needs are known in advance from the bandwidth requests, suitable schedules for forwarding CBR traffic through the switching systems can be pre-computed to accommodate the requests. This is only true, however, if the number of cells to be transmitted during any frame from any particular input or to any particular output of any intermediate switching system is no more than the frame size, N.

Each schedule associates each slot position within a frame with a pre-computed set of CBR flows that will be given absolute priority for use of the switch during that slot. Each CBR flow must be scheduled into a sufficient number of slots per frame to meet its bandwidth requirements.

Table 1 shows a highly simplified example of a set of bandwidth requests, each request expressed in terms of cells per frame, where the inputs of the switch are numbered one through four, as are the outputs.

TABLE 1

| Input | Output | | | |
|---|---|---|---|---|
| | 1 | 2 | 3 | 4 |
| 1 | 0 | 1 | 1 | 1 |
| 2 | 2 | 0 | 0 | 0 |
| 3 | 0 | 2 | 0 | 1 |
| 4 | 1 | 0 | 1 | 0 |

Thus, in the example of Table 1, input no. 3 needs to forward two cells per frame to output no. 2, a single cell per frame to output no. 4, and no cells to output nos. 1 and 3.

Table 2 depicts an example of a schedule suitable to meet the bandwidth requests represented in Table 1, where, for simplicity, the frame size is three slots, numbered one through three.

TABLE 2

| Slot 1: | 1 → 3 | 2 → 1 | 3 → 2 | N/S |
| Slot 2: | 1 → 4 | 2 → 1 | 3 → 2 | 4 → 3 |
| Slot 3: | 1 → 2 | N/S | 3 → 4 | 4 → 1 |

Thus, during slot 1 of each frame during which the schedule of Table 2 is implemented, input no. 1 is connected to output no. 3, input no. 2 is connected to output no. 1, input no. 3 is connected to output no. 2, and input no. 4 is not scheduled ("N/S") and need not be connected to any output.

When a new bandwidth request is made, it may be necessary to rearrange the connections specified by the schedule. For instance, if an additional request is received of one cell per frame from input no. 2 to output no. 4, the schedule of Table 2 must be rearranged in order to accommodate the new flow because there is no slot in which both input no. 2 and output no. 4 are free. A new schedule that meets all of the flow requests including this added flow's needs is given in Table 3.

TABLE 3

| Slot 1: | 1 → 2 | 2 → 1 | 3 → 4 | N/S |
| Slot 2: | 1 → 4 | 2 → 1 | 3 → 2 | 4 → 3 |
| Slot 3: | 1 → 3 | 2 → 4 | 3 → 2 | 4 → 1 |

Often, multiple bandwidth requests seek concurrent service for more than one flow originating from or destined for the same port. In order to prevent interference, two flows that conflict because they share a common input or output may not be scheduled during the same slot. A schedule that is free of such conflicts is described as legal. Thus, the schedule of Table 3 is legal.

CBR flows are forwarded across the switch during the scheduled slots. VBR cells are forwarded during slots not used by CBR cells. For example, in the schedule of Table 2, a VBR cell can be forwarded from input no. 2 to output no. 3 during the third slot without conflicting with the other flows. In addition, VBR cells can use a scheduled slot if no cell from the scheduled flow is present at the switch for forwarding during that slot.

Further information can be had concerning prior art switch scheduling within ATM switching systems by reference to Anderson, Owicki, Saxe and Thacker, "High Speed Switch Scheduling for Local Area Networks," presented at the International Conference on Architectural Support for Programing Languages and Operating Systems ("ASPLOS"), vol. 27, no. 9, Sep. 1992, the proceedings of which were published by ACM, New York, N.Y., U.S.A. in 1992. The disclosure of that article is incorporated herein by reference.

(c) Drawbacks in Cell Scheduling and Forwarding

While known methods of operating ATM switching systems are generally suitable for their intended purposes, they do not take into account, or provide solutions to, certain problems that can have adverse affects on switch design and/or switch performance.

A problem can arise when the cells of a CBR flow arrive at a switching system at an approximately constant rate, but are passed through the switch in slots clustered together in a part of the frame. Clustering may occur as a result of a systematic tendency of a scheduling method to produce clustering. For example, a scheduling method which attempted to assign each unit of requested bandwidth into the lowest earliest available slot in the frame would tend to produce severe clustering. Clustering may also be the result of statistical variability in scheduling methods that depend on random or pseudo-random events, either through the specific use of pseudo-random numbers in the generation of schedules or through the sensitivity of a scheduling method to the order in which virtual circuits happen to be created and destroyed.

Such clustering can increase cell latency in switching systems. In a highly simplified example, where the scheduled slots for a CBR flow are clustered in slot nos. 2, 3 and 5 of a 1024-slot frame, if the cells of the flow start arriving at the switching system in slot no. 6 of a frame, the cells must wait in the switching system until slot no. 2 of the next frame before forwarding across the switch can commence. It can be seen that the latency period until forwarding for the incoming cells may be on the order of a frame size, which is unacceptably long in many applications. Moreover, the system must be equipped with an input buffer having a size sufficient to hold the incoming cells pending forwarding across the switch or else cells will be lost. The size of input buffering required to avoid loss of cells must be large, e.g., on the order of the per-frame bandwidth (e.g., 1024 per port per frame) of the switch.

Another clustering problem occurs in switching systems where the switch drives communication links that run at lower bandwidths (e.g., 155 MBit/sec) than the per-port bandwidth (e.g., 800 megabits per second) of the switch fabric. In such a switching system, output buffering must be provided at the output ports of the switch fabric to store outgoing cells pending transmission over the slower output links. If the time slots reserved for cells using a particular output link are clustered into only a portion of a frame, the required output buffering at a link may be on the order of the per-frame bandwidth of the link, and the latency due to output buffering may on the order of a frame duration.

SUMMARY OF THE INVENTION

The invention resides in a method and apparatus for generating and implementing a "smooth" schedule for forwarding of cells across a switch in a communication network, such as an ATM network. The schedule is obtained by recursively dividing bandwidth requests into nearly equal subrequests, and selectively allocating the subrequests to slots of a frame in a manner that obtains approximately uniform temporal distribution of cell forwarding over the duration of the frame. Implementation of such a schedule can reduce or even eliminate clustering of cell forwarding across the switch, thereby reducing latency and space requirements for input and output buffering compared to conventional scheduling methods. Moreover, if the bandwidth request for each flow includes a specific output link among those driven by the flow's output ports, the invention can guarantee that the schedule will have the additional property that the scheduled time slots for the aggregate of all flows using any given output link are also approximately uniformly distributed throughout the frame.

The schedule provided by the invention can be guaranteed to have both of these "smoothness" properties, i.e., with respect to cell forwarding per flow and per link, regardless of the complexity of the pattern of bandwidth requests and regardless of the amount of load, provided the following conditions are met: (1) the total bandwidth of all requests using any given input or output port (i.e., the load on that port) is no greater than the per-port bandwidth of the switch; and (2) the total bandwidth of all requests for any given link (the "load" on the link) is no greater than the bandwidth of the link.

In a specific embodiment, the invention can be practiced in a communication network including host stations each capable of transmitting cells to other hosts, and at least one switching system interconnecting the hosts. The switching system includes a switch, e.g., a crossbar or other point-to-point switch, having input ports connectable for receiving cells from the hosts, output ports connectable for forwarding cells to the hosts, and a switching fabric for providing simultaneous, selective interconnections of the input ports and output ports responsive to set-up signals. In that network, the invention entails a method for generating and implementing a schedule, which specifies the interconnections of input ports and output ports for at least one frame of "N" time slots. Preferably, "N" is an integer power of two. If not an integer power of two, some degree of smoothness can still be achieved by dividing the frame into two subframes plus an extra slot, and then scheduling a sufficient number of flows into the odd slot, so as to allow the rest to be divided between the two subframes.

The method in an illustrative implementation includes the step of obtaining a set B of bandwidth requests r, which can be received, e.g., over the network or generated by the switching system. Each bandwidth request r includes data representing a request for forwarding of a specified number of cells of a flow per frame from a specified input port to a specified output port. The specifications in the bandwidth requests of each of the items referred to in the preceding sentence can be made directly or indirectly, e.g., specifying input and output ports by identifying a virtual circuit for the flow or specifying bandwidth in bits per second from which the accessing number of cells per frame can be computed. Each bandwidth request set B should be feasible for the frame, as determined by admission control procedures for the network or by testing feasibility separately, e.g., at the time of schedule computation.

The method computes a schedule S for the flows by performing the following steps:

1) If N equals one, which indicates that the frame has a single time slot, the method schedules all positive bandwidth flows in the bandwidth request set B into the single time slot to yield a schedule S.

2) If N is greater than one, the method splits each request r into first and second subrequests r1, r2, splits the bandwidth request set B into first and second bandwidth subrequest sets B1, B2, and splits the frame into first and second subframes F1, F2. Each subrequest set B1, B2 is associated with a different one of the subframes F1, F2 and has a number of bandwidth subrequests. The number of cells per frame specified in the subrequest set B1 is approximately equal to the number of cells per frame specified in the subrequest set B2. Each subframe has half (N/2) of the N time slots of the frame.

3) After the splitting steps of the preceding paragraph, the method uses these same steps (1) through (5) recursively to produce a first sub-schedule S1 that allocates the flows of the first bandwidth subrequest set B1 to the first subframe F1. We refer to this computation of the subschedule for S1 as a "child computation" to the computation of the schedule for S, and to the computation of the schedule for S as a "parent computation" to the computation of the schedule for S.

4) The method also uses these same steps (1) through (5) to perform a second child computation producing a second sub-schedule S2 that allocates the flows of bandwidth subrequest set B2 to the second subframe F2. Each child computation uses a value of N that is half that used in its parent computation. For example, the computation of a schedule for a frame of size N=1024 slots will include two child computations, each producing a schedule for a subframe of size N=512 slots. Each of those child computations will itself include two child computations (four in all) scheduling 256-slot frames, and so on down to the 1024 child computations that schedule single slots (subframes of size N=1).

5) After completing the recursions, the method appends the first and second sub-schedules S1 and S2 to yield a schedule S.

After computing the schedule S, the method installs the schedule S, for example, by storing it in a schedule memory and later selecting it for use by the switching system during at least one of the frames. After installation, the method causes set-up signals to be generated to enable the switch interconnections to be made to implement schedule S, whereby flows can be forwarded with an approximately uniform temporal distribution in accordance with schedule S.

In another aspect of the invention, the splitting step described above (i.e., step (2)) can be performed by separating the bandwidth subrequests r1 and r2 into first and second groups, wherein the first group has pairs of subrequests r1, r2 of equal bandwidth obtained by splitting requests r specifying even bandwidths, and the second group has pairs of subrequests r1, r2 of unequal bandwidth obtained from splitting requests r specifying odd bandwidths. For the first group, the method can allocate subrequest r1 to subrequest set B1 and subframe F1 and subrequest r2 to subrequest set B2 and subframe F2, or vice versa. Since r1 and r2 are equal, their allocation makes no difference. For the second group, the method preferably implements input and output pairing (as defined below) of the subrequests r1, r2 and allocates the subrequests r1, r2 responsive to such pairing so that (i) for each input port i, the numbers of odd-bandwidth requests r for input port i whose larger subrequests are allocated to subrequest sets B1 and B2 differ by at most a selected number of cells, preferably a single request; (ii) for each output port o, the numbers of odd-bandwidth requests r for output port o whose larger subrequests r1, r2 are allocated to subrequest sets B1 and B2 differ by a selected number of requests, preferably a single request; and, therefore, (iii) subrequest sets B1, B2 specify first and second bandwidths that differ by at most a number (preferably, one) selected cell per frame for each input port or output port.

In a further aspect of the invention, the splitting step can be performed such that, for any flow f, the bandwidths of flow f in subrequest sets B1 and B2 differ by at most a selected number (preferably, one) cell per frame; for any input port i, the loads on input port i in subrequest sets B1 and B2 differ by at most a selected number (preferably, one) cell per frame; and for any output port o, the loads on output port o in subrequest sets B1 and B2 differ by at most a selected number (preferably, one) cell per frame.

In yet another aspect of the invention, the splitting step can entail splitting each request r into pairs of bandwidth subrequests r1, r2 such that subrequests r1, r2 have the same flow, input port and output port as request r; the bandwidth of subrequest r1 is one half that of request r, rounded down to an integer if the bandwidth of request r is odd; and the bandwidth of subrequest r2 is one half that of request r, rounded up to an integer if the bandwidth of request r is odd.

In yet another aspect of the invention, each output port may serve a multiplicity of output links, each flow is directed to a specific output link, and the splitting step entails splitting the request set B such that, for every output link 1, the aggregate loads for all flows to 1 in subrequest sets B1 and B2 differ by at most a selected number (preferably, one) cell per frame.

In still another aspect, the splitting step can entail splitting the request set B such that the aggregate load for all flows in subrequest set B1 differs from the aggregate load for all flows in subrequest set B1 by at most a selected number (preferably, one) cell per frame.

In yet another aspect, the method can treat all flows from a given input port to a given output port as though they constituted a single flow, and devise the schedule accordingly. This achieves efficiency in computation of the schedule.

In yet another aspect, the method can perform first a preliminary scheduling phase in which of all flows from a given input port to a given output port (or to a given output link, in the case where output ports may serve multiple links) are treated collectively as though they constituted as single flow and then a second scheduling phase in which the slots allocated collectively in the first phase to any group of flows are allocated to the constituent flows individually. This achieves efficiency in the computation of the schedule.

BRIEF DESCRIPTION OF THE DRAWINGS

For a fuller understanding of the nature of the invention, reference should be had to the following detailed description taken in connection with the accompanying drawings, in which:

FIGS. 7–9 are diagrammatic tables of flows in an illustrative practice of the splitting method of FIG. 6; and FIG. 10 is a diagrammatic table useful in describing a method of smooth scheduling for switches with limited channels.

DETAILED DESCRIPTION OF ILLUSTRATIVE EMBODIMENT

A) DESCRIPTION OF NETWORK TOPOLOGY

Figure 1:
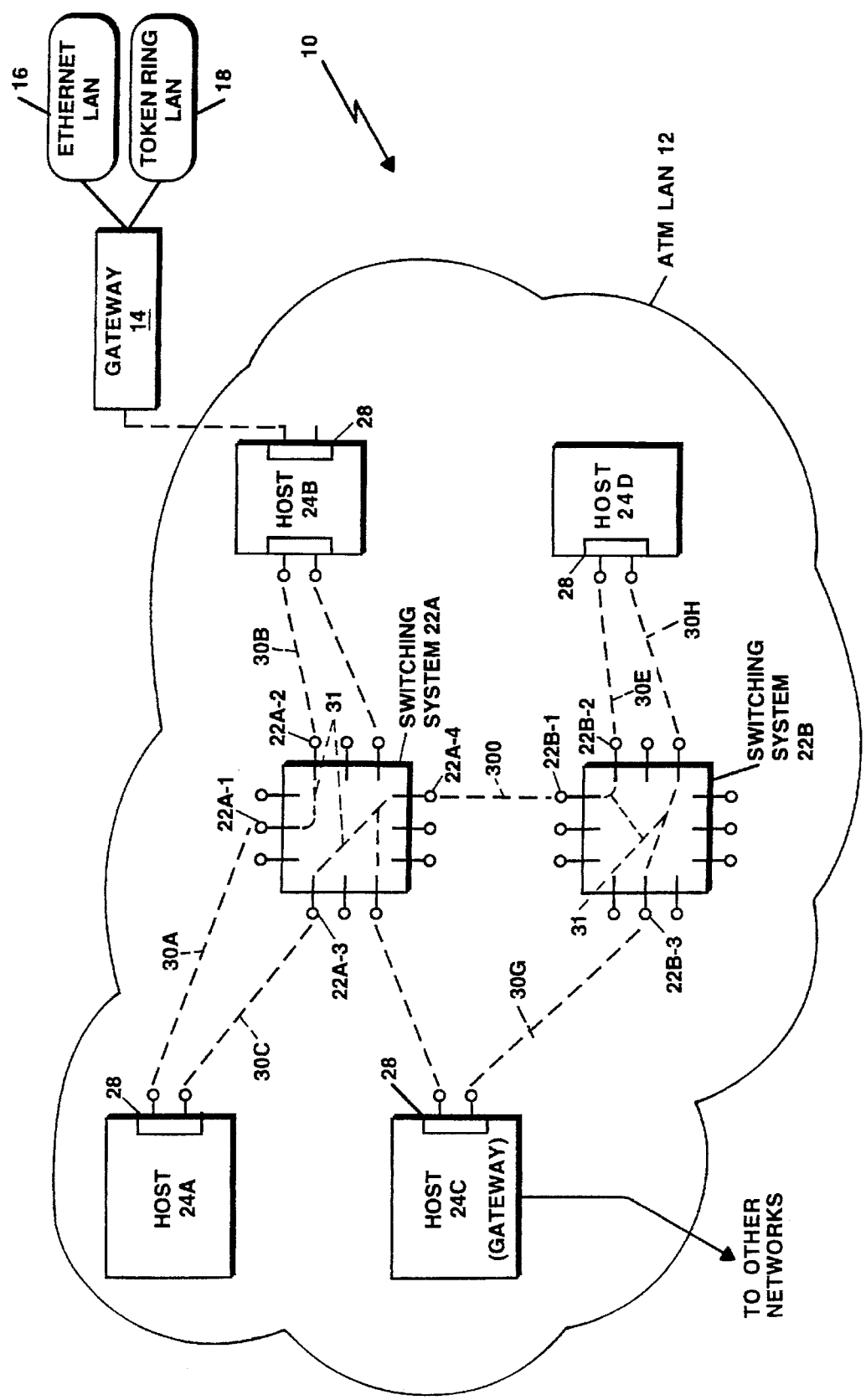
FIG. 1 is an representation of an illustrative communication network, which may employ the invention.

FIG. 1 shows a computer communication network 10, which may employ the invention. The computer communication network 10 includes an ATM local area network ("LAN") 12 and a gateway 14 for connecting the ATM LAN 12, e.g., to other networks, such an Ethernet LAN 16 and a token ring LAN 18.

The ATM LAN 12 includes a number of switching systems 22A, 22B for interconnecting a plurality of host stations 24A . . . , 24D via links 30A, 30B . . . , e.g., optical cables. Each host station 24A–24D is preferably a general-purpose computer or communication device having a communication controller 28. The communication controllers 28 typically generate cells from supplied data, and send and receive cells over the links 30A, 30B . . . The controllers 28 are also responsible for transmitting cells containing bandwidth requests, which are generated from data supplied, e.g., by the hosts 24A–24D. The host stations 24A–24D can also server as gateways to other networks, as illustrated by host 24C.

In the ATM LAN 12, cells are forwarded from a source entity, e.g., the host station 24A–24D that generated the cell, to a destination entity, e.g., the host station 24A–24D within the ATM LAN 12 that is to receive the cell ultimately. For cell forwarding between the respective source and destination entities, the cells are directed along paths through one or more switching systems 22A–22B.

For example, cells from host station 24A can be directed along connection 30A to an input terminal 22A-1 of switching system 22A, and then from an output terminal 22A-2 along connection 30B to host station 24B. Other cells from host station 24A can be directed along connection 30C to another input terminal 22A-3 of switching system 22A, then from another output terminal 22A-4 along connection 30D to an input terminal 22B-1 of switching system 22B, and finally from an output terminal 22B-2 along link 30E to host station 24D. Analogously, cells from host station 24C can traverse connection 30G to switching system 22B, and then connection 30H to host station 24D. Alternatively, flows can use line 30A, which can be connected at different times to different ports of switching system 22A for forwarding to their respective destinations, so as to time-multiplex the line.

Each switching system 22A-22B is responsible for making the necessary internal configurations for connecting input terminals 22A-1, 22A-3, 22B-1, etc. to appropriate output terminals 22A-2, 22A-4, 22B-2, etc., as illustrated by internal connections 31. The set of internal connections 31 in use may vary from one time slot to the next.

The invention can be employed in a variety of network configurations other than that illustrated in FIG. 1, as will be apparent to those skilled in the art. The invention may find applicability to any cell-based switching network or system using bandwidth requests for the provision of services by a shared resource with limited bandwidth, particularly wherein latency and I/O buffering is to be limited.

B) DESCRIPTION OF SWITCHING SYSTEM

Figure 2:
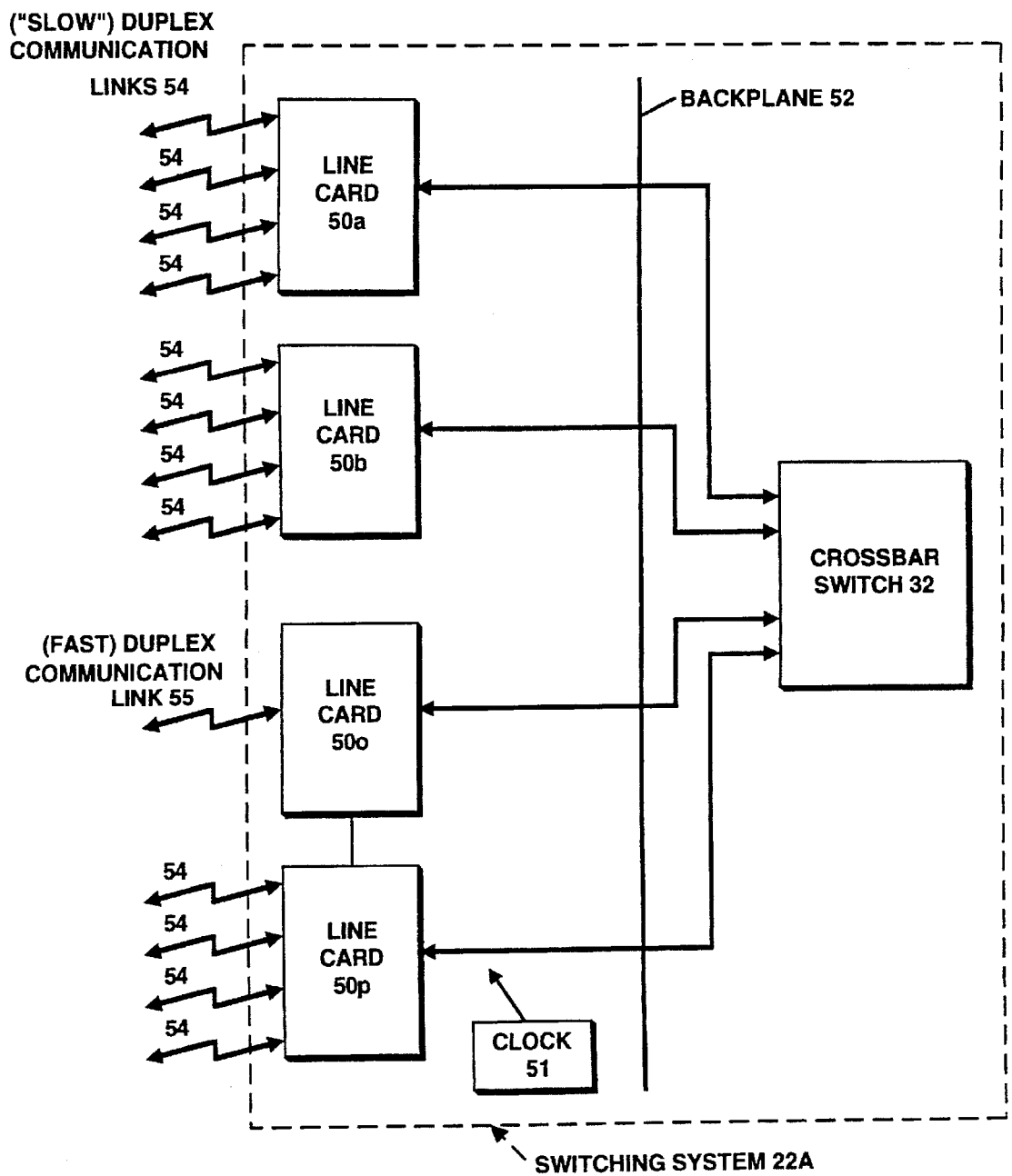
FIG. 2 is a block diagram of one of the switching systems of FIG. 1.

FIG. 2 shows components of switching system 22A; the other switching system 22B being generally identical in overall structure and operational capability and need not be separately shown. The switching system 22A has a point-to-point switch 32, such as a conventional, e.g., 16 by 16, crossbar switch, which is connected through a backplane 52 to a number of (e.g., sixteen) line cards 50a–50p. The switch 32 and line cards 50a–50p of switching system 22A utilize a common clock 51, which provides a time base for the switching system 22A. Time at the switch is divided into slots, each time slot consisting of a fixed number of clock cycles.

Each line card 50a–50p is coupled to a number of communication links 54, 55. The line cards designated 50a, 50b and 50p can be called "quad" or "four-headed" cards, since each is coupled with four communication links 54, e.g., four 155 MBit/sec ("slow") coaxial cables. On the other hand, line card 50o can be called a "single-headed" line card because it is coupled with a single link 55, e.g., a 622 Mbit/sec ("fast") fiber optic cable.

Other embodiments may use some number of line cards other than that shown, or can be implemented such that components of multiple line cards are incorporated within a single card, board or chip. Moreover, other embodiments may use one or more line cards having a number of heads different from those shown in FIG. 2.

Figure 3:
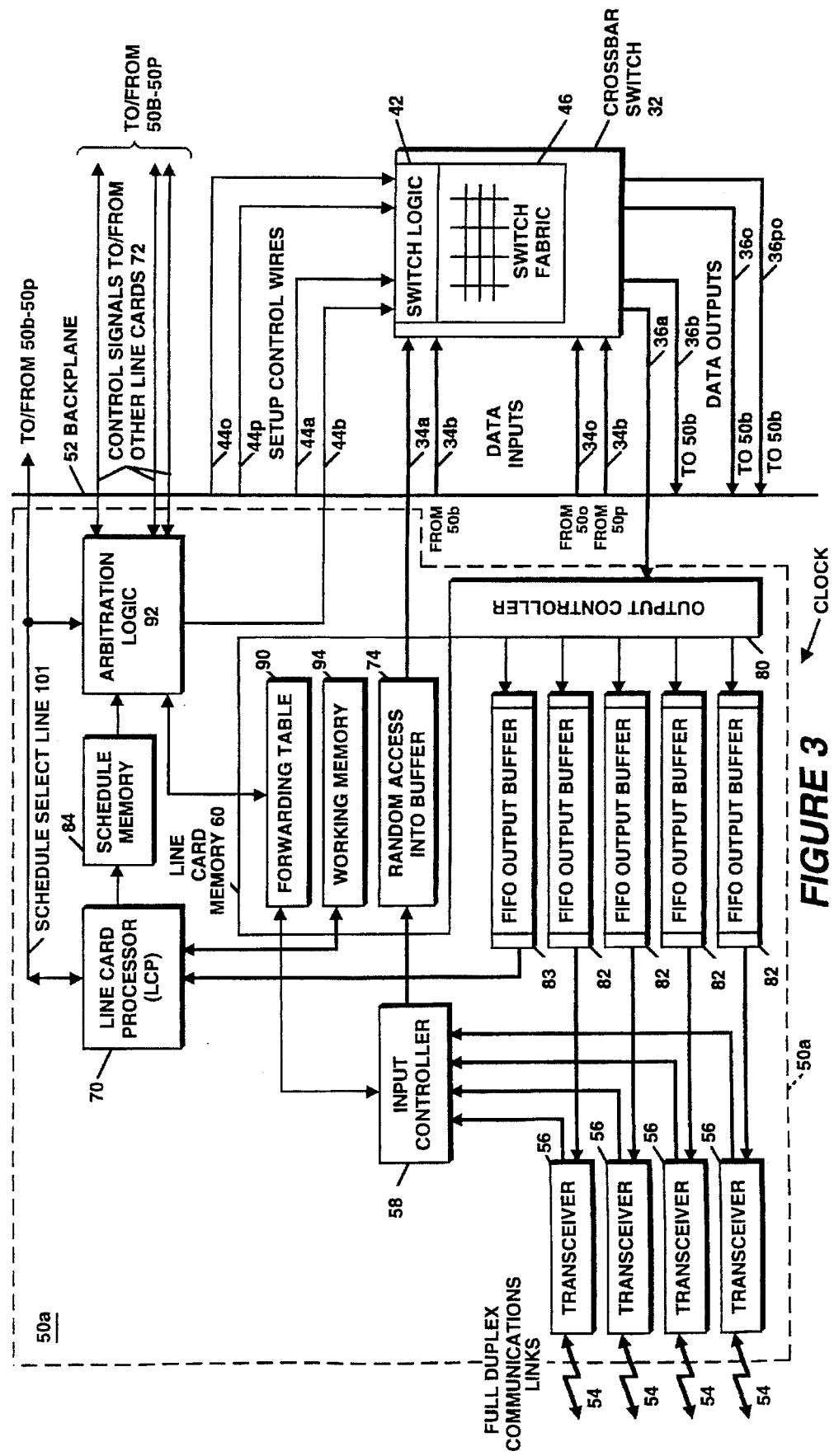
FIG. 3 is a more-detailed block diagram of a portion of the switching system of FIG. 2.

FIG. 3 shows quad line card 50a in more detail, along with its connections through the backplane 52 to switch 32 and the other line cards 50b–50p. The other line cards 50b–50p of FIG. 2 are preferably identical in structure and operational capability to line card 50a, except as noted, and need not be separately shown.

The switch 32 of FIG. 3 has a number of (e.g., sixteen) data inputs 34a–34p electrically connectable selectively to a number of (e.g., sixteen) data outputs 36a–36p by an internal network 38 of conductors 40. Each of the conductors 40 can have a set of bit lines, e.g., data lines and associated control lines. In response to setup signals received over setup lines 44, switching logic 42 of the crossbar switch 32 establishes connections between those of the conductors 40 connected to inputs 34a–34p and others of the conductors 40 connected to outputs 36a–36p, thereby enabling selected switch connections. During a single time slot, sixteen cells can be forwarded across the 16 by 16 switch fabric 46; each entering the switch fabric 46 at a different input 34a–34p and leaving at a different output 36a–36p.

Line card 50a provides data cells to the switch 32 via a dedicated one of the data inputs, i.e., data input 34a, and receives data cells from the switch 32 via a dedicated one of the data outputs, i.e., data output 36a. Inputs 34b through 34p are connections to the crossbar switch 32 from line cards 50b through 50p, respectively; outputs 36b–36p are connections from the switch 32 to other line cards 50b through 50p, respectively. The line card 50a is interconnected through the backplane 52 with the other line cards 50b–50p by way of line card control lines 72, which are used by the line cards to negotiate with each other during arbitration. This includes arbitration for both VBR and CBR traffic. CBR flows always win the arbitration for their scheduled slots if cells are available for transmission.

Line card 50a includes multiple transceivers 56, an input controller 58 for performing cell-header reading and multiplexing, and a line card memory 60. The transceivers 56 receive cells over full duplex communication links 54, and pass them to the input controller 58. Since card 50a is a "quad" line card, it includes four transceivers; the single-headed line card 50o requires only a single transceiver connected to the link 55 (FIG. 2). The input controller 58 processes header information of the received cells, and passes the received cells to an input buffer 74 for storage pending forwarding of the cells through the switch 32. The input controller 58 also maintains data in forwarding table 90 responsive to the cell-header information to keep track of (i) identification of the flow to which cells in the input buffer 74 belong, and (ii) the next destination to which the cells should be sent in order to reach their ultimate destinations. The next cell destinations determine the switch output ports 36a–36p to which the cells must be forwarded.

The line card 50a also includes an output controller 80 and multiple output buffers 82, 83. Each output buffer 83 is connected to one of the transceivers 56, and thereby to the communication link 54 driven by that transceiver. Output buffer 83 is connected to line card processor 70 for storing cells destined to that storing LCP. (Each single-headed line card 50o requires only a single output buffer 82 connected to a single transceiver 56 and communication link 55 and an output buffer 83 for cells destined to line card processor 70.) The output controller 80 selectively transfers individual cells received from the switch 32 to a selected one of the output buffers 82, 83 in response to the next destination information for the cells. Output buffers 82 store the cells that they receive until the corresponding transceivers 56 are ready to transmit the cells, and then provide the cells to the transceivers. Output buffer 83 receives control cells sent through the switch, which contain status and control information, and makes those cells available for reading by a line card processor ("LCP") 70 of the line card 50a, as described below.

From the foregoing, it can be seen that ATM cells pass through line card 50a of switching system 22A along the following receive path: First, the cells of a flow are received over one of the communication links 54 by the associated transceiver 56. The input controller 58 funnels cells from all four transceivers 56 into the input buffer 72. Then, the cells from the input buffer 72 are directed through the switch 32, which is configured to direct them to an appropriate output port 36a–36p. After forwarding through the switch 32, the cells follow a transmission path. Specifically, the cells of each flow are directed by the output controller 80 of the line card, which is connected to the port through which they just passed, to a selected one of the output buffers 82, 83, either (i) for transmission by the transceiver 56 coupled with the selected buffer, in the case of cells bound for other switching systems or a host system, or (ii) for provision to LCP 70 in the case of control cells bound for line card 50a. For case (i)

in the preceding sentence, the communication link 54 coupled with the transceiver 56 carries the cells of the flow to another switching system, e.g., switching system 22B (FIG. 1), or to a host station, e.g., one of host systems 24A–24D (FIG. 1).

Configuring of the switch 32 for forwarding of the ATM cells involves a number of components of the line card 50a–50p, including the LCP 70, a schedule memory 84 and arbitration logic 92 of line card 50a and the corresponding components of the other line cards 50b–50p. The LCP 70 of each line card 50a–50p takes part in a distributed process of scheduling of cell forwarding across the switch 32, which necessitates coordination among the line cards 50a–50p. (Other implementations of the invention can use a more centralized process of scheduling.) The LCP's 70 only process the control cells; most of the cells that pass through the switching system 22A are not processed by the LCP's 70 of any the line cards 50a–50p. The control cells include, e.g., data specifying the addition or removal of virtual circuits, the state of the network, including network configuration data, and/or error handling information.

Specifically, the LCP's 70 generate schedules for forwarding CBR cells across the switch 32. The schedules are generated in accordance with the invention as described below in conjunction with the remaining figures. Once generated, the LCP's 70 store the schedules preferably in schedule memories 84 of the line cards 50a–50p, which provides them to associated arbitration logic 92 for installation.

Arbitration logic 92 on the line card 50a communicates with other line cards 50a–50p through the backplane 52 over lines 72, in generating set up signals to configure the switch 32 appropriately for forwarding of cells therethrough. The set-up signals take into account and are responsive to (i) the CBR schedules, (ii) the availability of CBR cells for any scheduled CBR flows, and (iii) the availability of cells for any VBR flows. To determine availability of CBR and VBR cells, the arbitration logic 92 accesses the data contained in the input buffer 74, 90. The process of VBR forwarding is coordinated by the arbitration logic 92 of the line cards 50a–50p, e.g., by implementing the iterative matching technique that is described in the ACM publication referenced above. Iterative matching is also described in U.S. Pat. No. 5,267,235, issued Nov. 30, 1993. The setup signals are provided to the switch 32 over lines 44.

Switch logic 42 is responsive to the setup signals for configuring the switch 32 appropriately for each time slot. Accordingly, switch fabric 46 forwards the cells during the allocated time slots to an output port 36a–36p connected via backplane 52 to the appropriate one of the line cards, 50a–50p, e.g., line card 50b, for transmission on the next legs of the cells' virtual circuit.

The foregoing paragraph pertains to cells that are received by the switching system 22A. The LCP's 70 also generate control cells for transmission over the network. The LCP 70 supplies the locally generated cells to the input buffer 74, from which they are forwarded through the switch 32 to an appropriate one or more of the output buffers 82, and then along the transmission path described above.

The input and output buffers 74, 82 play a significant role in an underlying purpose for the invention. The input buffer 74 on the line card 50A is preferably of sufficient size to hold incoming cells pending forwarding across the switch 32. Preferably, also, the input buffer 74 is random access; i.e., cells can be taken out, i.e., read out, in any order, and not just in their order of arrival. The output buffers 82, on the other hand, are relatively small, e.g., holding only about twenty cells each, and provide principally speed matching between the crossbar switch 32 and the communication links 54. The output buffers 82 are FIFO (first-in, first-out) queues; i.e., cells leave each output buffer in the same order as they are put into the output buffer.

If cells of a flow were passed through the switch 32 in slots clustered together in a part of the frame, and yet arrive at the switching system 22A at an approximately constant rate, cell latency might be on the order of a frame size, which is unacceptably long in many applications. Moreover, the size of the input buffer 74 would need to be large in order to avoid loss of cells under these circumstances, e.g., on the order of the per-frame bandwidth of the switch 32, i.e., thousands of cells. Moreover, since the output buffers 82 are preferably small, and the switch's ports are often faster than the links 54, there is a potential for cells to cross the switch 32 at a rate and for a duration that will cause the associated output buffer 82 to overflow, causing cells to be lost. ATM systems can use large output buffers to avoid risking cell loss, but that requires additional resources.

C) METHOD OF SMOOTH SCHEDULING AND FORWARDING FLOWS (i) Overview of Method 100

Figure 4:
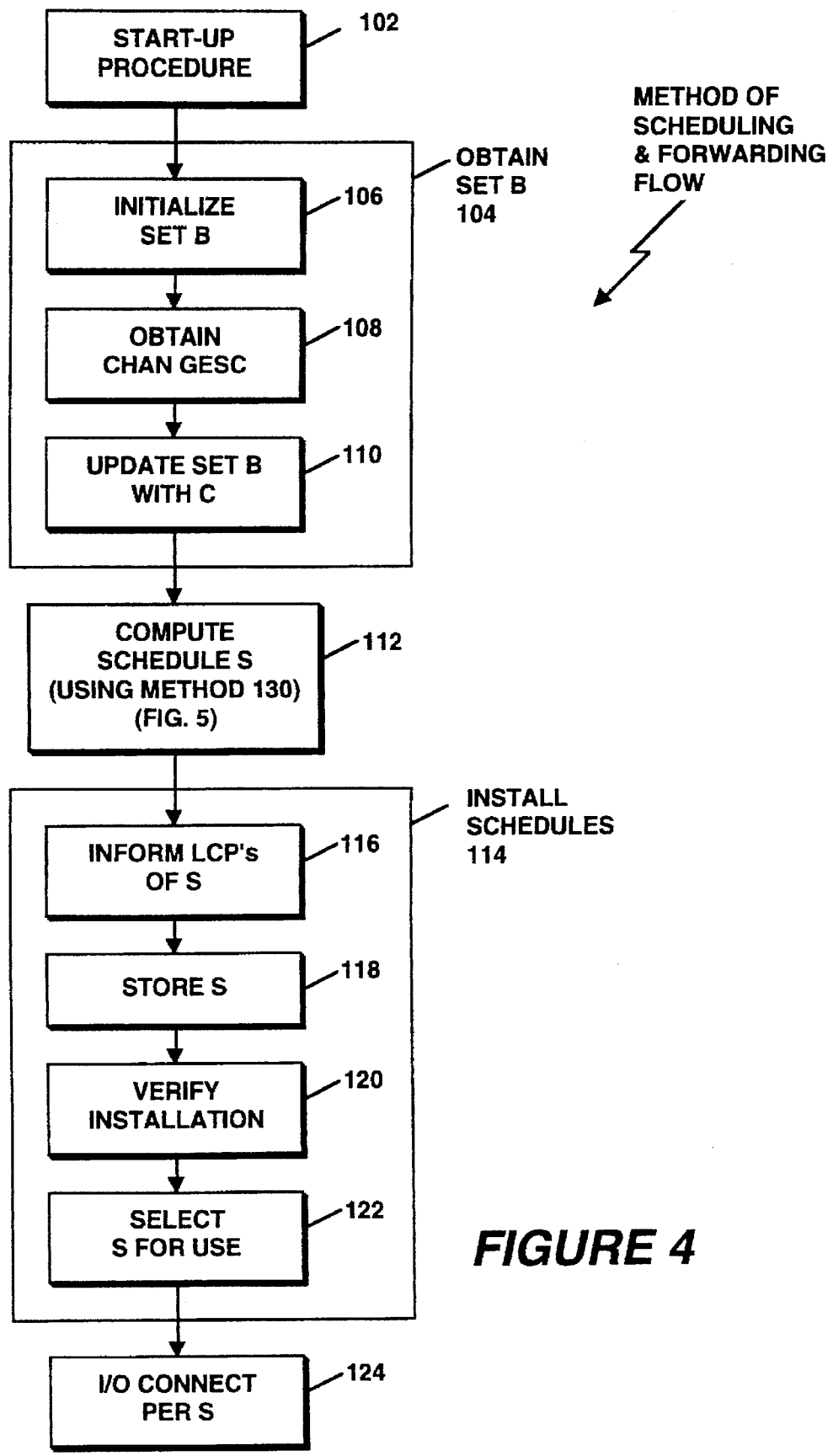
FIG. 4 is a block diagram of a method for generating a schedule and forwarding flows across the switching system of FIG. 2 in accordance with a preferred embodiment of the invention.

FIG. 4 shows a method 100 of scheduling and forwarding of flows in accordance with a preferred embodiment of the invention. By practicing method 100, the switching system 22A can obtain approximately uniform temporal distribution of scheduled slots for individual flows, i.e., smoothness for the individual flows, within each frame, thereby metering cell regulating across the switch to overcome the drawbacks noted above. (Smoothness for aggregates of flows will be discussed below.) Thus, method 100 can avoid slot clustering and the difficulties such clustering can cause at both the input and output ends of the switch system 22A. In this way, method 100 can reduce worse-case input and output latency, and worse-case input and output buffering requirements for CBR flows. Section F, below, provides a more qualitative characterization of smoothness.

The method 100 can be implemented, e.g., by the LCP's 70 (FIG. 3) of the line cards 50a–50p (FIG. 2) of switching system 22A (FIG. 2), or, alternatively, by other general-purpose processors, or in discrete logic or firm ware (not shown). In any of these implementations, the method 100 can be performed in two stages. In the first stage, the method 100 treats as an aggregate all flows from a given input port 34a–34p to a given output port 36a–36p (or, alternatively, to a given output link 54, as described below in the "Alternative Embodiment" section), and determines the flow aggregates which will be scheduled for each time slot. In the second stage, the method 100 apportions time slots scheduled for each aggregate to the individual flows comprising that aggregate.

The tasks involved in the first stage of scheduling can be distributed among the LCP's 70 of the line cards 50a–50p. Individual LCP's 70 can schedule different parts of each frame, e.g., a first LCP can schedule a request subset B1 for a subframe, and a second LCP can schedule a request subset B2 for a second subframe, with one of the LCP's serving as a "master" for coordinating the scheduling tasks. with each LCP 70 considering flows (or aggregates of flows) between all inputs 34a–34p and outputs 36a–36p in computing a schedule for those ports 34a–34p, 36a–36p connected to the particular line card 50a–50p containing the LCP 70. In the second stage, each LCP 70 preferably processes only those flows that need to use its associated input 34a–34p and output 36a–36p, e.g., in the case of line card 50a, input 34a and output 36a. When each LCP 70 completes the second stage of scheduling, it stores the resulting schedule in the scheduling memory 84, and notifies a master LCP, e.g., a designated one of the LCP's of the switching system 22A, by sending a status cell containing the notification through the switch 32. After the master has received the schedules (and has itself finished computing and storing its schedule), it toggles the state of a schedule select line 101, thereby signalling simultaneously that the arbitration logic modules 92 in all the line cards 50a–50p should "change-over" and begin using the new schedule.

Alternatively, the method 100 can be performed in a way that combines the two stages, thus scheduling individual flows directly. Again, it is inconvenient in this case to have individual LCP's 70 consider only flows to or from a given input 34a–34p or output 36a–36p connected to the line cards 50a–50p that contain the LCP's. After the schedule is computed, the LCP(s) 70 that computed it must transmit control cells through the switch 70 to each other LCP to notify them of at least the portions of the computed schedule that concern flows using the respective input ports 34a–34p on their line cards 50a–50p. When the LCP 70 on a given line card 50a–50p has received the portion of the schedule that it needs, and has stored it into the associated schedule memory 84, the LCP 70 notifies the master by sending a control cell through the switch 32. When the master has been notified by all the other LCP's 70 (and has itself stored its portion of the schedule), the master toggles the schedule select line 101.

Regardless of whether the schedule is computed centrally or not, or in a single stage or two, the method 100 preferably entails the steps illustrated in block diagram form in FIG. 4. There, block 102 performs start-up procedures, e.g., by fetching switching system data from a working memory 94 of the line card memory 60 FIG. 3 during network configuration. That data can represent characteristics of the switching system 22A, including: (i) the number of input ports 34a–34p (FIG. 3), called "indegree", (ii) the number of output ports 36a–36p (FIG. 3), called "outdegree", and (iii) the required frame size N, which preferably is an exact power of two. Alternatively, for particular embodiments of the method, the indegree and outdegree (or upper bounds thereon) and the frame size may be built-in constants.

Block 104 fetches a set of bandwidth requests from the memory 60. Each bandwidth request preferably includes data specifying (i) an identification ("ID") of a particular flow f to which the request pertains, which ID is unique within the set, (ii) the input port number for the flow f, which is in the range 0 to indegree-1, (iii) the output port number for the flow f, which is in the range 0 to outdegree-1, and (iv) the bandwidth for the flow, expressed preferably as a non-negative integer number of cells per frame. "Indegree" and "outdegree" are positive integers.

Block 104 can be subdivided into blocks 106–110. Block 106 initializes the set B, e.g., to the set of requests as previously updated. Block 108 fetches changes to the set B, e.g., additional requests received over the ATM network or generated by line card 50a, from the memory 60, which hold the changes in a change queue. Block 108 also assigns an epoch number to the fetched changes for identification purposes, e.g., in case an error or fault condition (e.g., insufficient space in working memory 94) requires removal of the changes from the set B. Block 110 updates set B to reflect or incorporate the fetched changes.

The updated request set B will always be "feasible" because the ATM system 12 will have preferably exercised admission control to deny service to any bandwidth request whose addition to the request set B would have made the request set infeasible. (The bandwidth request set is regarded as "feasible" for a frame size N if there is no input 34a–34p or output 36a–36p whose load for the set exceeds N.) If the invention were implemented in a system lacking such admission control, block 104 would also test the updated set B to assure its feasibility.

The load on each port for the set is the sum of the requested bandwidths for all requests in the set that name that port as the input port for the corresponding flow, and the load on each output port for the set is the sum of the requested bandwidths for all requests in the set that name that port as the output port for the corresponding flow.

Block 112 computes a legal, smooth schedule S that satisfies all the bandwidth requests in set B. In schedule S, each flow is associated with one or more time slots in the frame. The number of time slots allocated to each flow equals the bandwidth requested for that flow, expressed as a number of slots per frame. No two flows that use the same input port or that use the same output port are scheduled in the same time slot. Block 112 encompasses a number of sub-steps, which are described below in conjunction with FIG. 5.

Continuing for now with FIG. 4, block 114 represents installation of the schedule S, whereby that schedule can be used for forwarding of cells. Block 116 generates control cells and sends them through the switch 32 to all the other line cards 50b–50p to inform the other LCP's 70 of schedule S. In block 118, the LCP's 70 of all the line cards 50a–50p, including the master, e.g., line card 50a, store the schedule S in their associated schedule memories 84. Each schedule memory 84 can preferable hold two schedules, a former one and a new one. Block 120 verifies that the new schedule has been installed by checking whether the LCP's of the other line cards 50b–50p have acknowledged receipt (and storage) of the new schedule. Block 122 selects the new schedule S for use by causing the arbitration logic 92 of the master, e.g., the LCP 70 of card 50a, to toggle select line 101, which is connected to the arbitration logic 92 on each other line card 50b–50p. Toggling of select line 101 indicates that the new schedule S has been communicated to all other line cards 50b–50p and that the new schedule is now ready for use. If the select line 101 is not toggled, the former schedule continues to be used; when toggled, all the line cards 50a–50p switch to the new schedule.

With the new schedule installed, block 124 causes the arbitration logic 92 to generate set up signals to configure the switch 32, thereby enabling the appropriate input/output connections thereof in order to implement the schedule S. In accordance with the schedule S, the switch 32 can then forward those CBR cells waiting in the input buffer 74 that are the subjects of the requests of set B. The set-up signals may also cause ports not used for CBR cell forwarding to be used for forwarding any available VBR traffic. Accordingly, block 124 embraces the foregoing steps of generation of set-up signals, configuring of the switch and forwarding of cells in accordance with the computed schedule.

The LCP executes steps 108–122 repeatedly in a loop, along with other tasks such as error handling. Step 124 is executed continuously by other hardware, e.g., the switch fabric under control of the arbitration logic 92 and makes the I/O connection pursuant to the then installed schedule.

(ii) Method 130 for Computing Schedules

Figure 5:
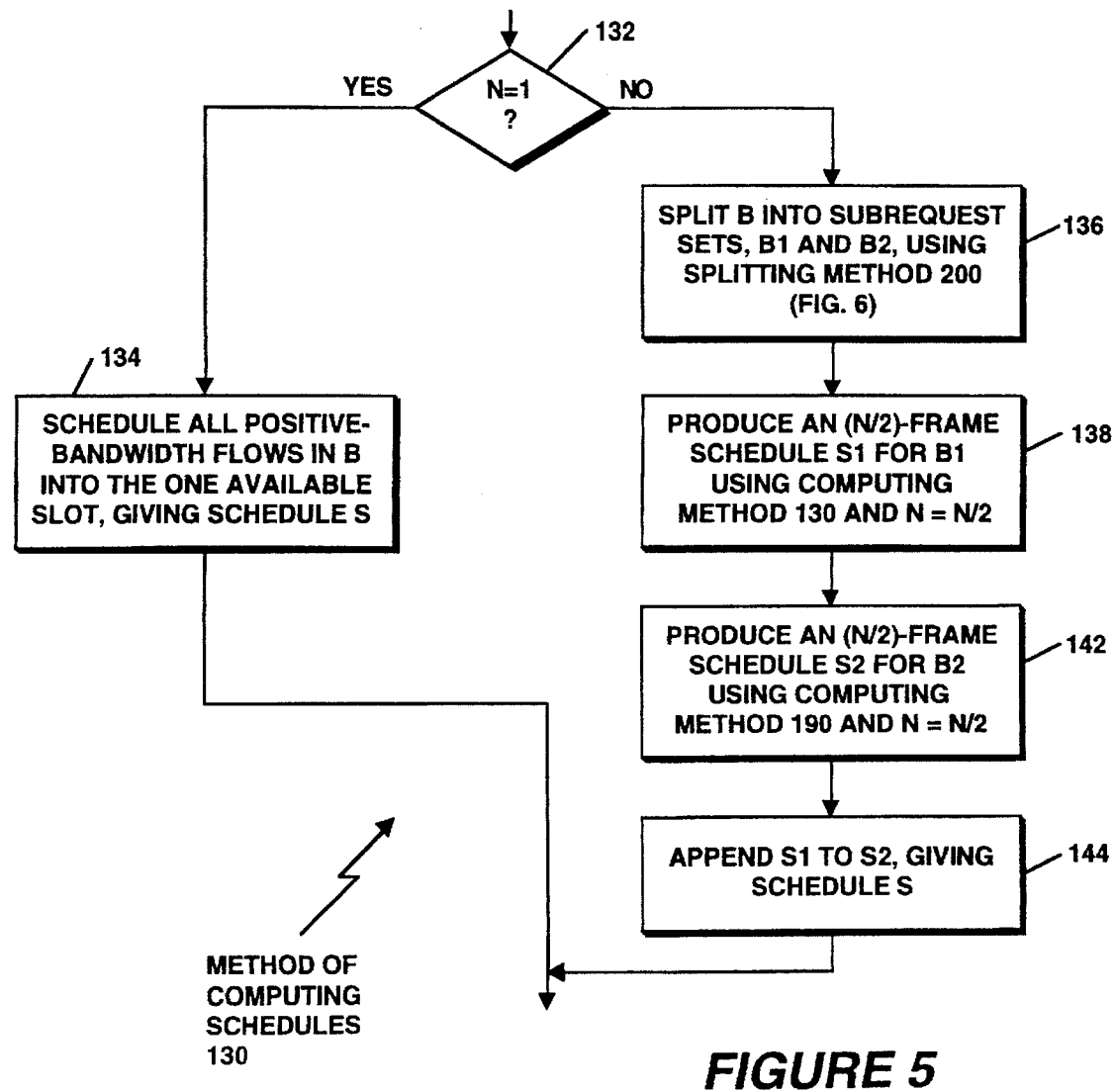
FIG. 5 is a block diagram of a method for computing schedules in accordance with a preferred implementation of block 112 of FIG. 4.

FIG. 5 depicts a preferred method 130 for computing schedules and thus implementing block 112 of FIG. 4, above, where "N" can be any value that is a power of two. Block 132 tests whether $N=2^0=1$, i.e., whether there is just a single slot available in the frame (or, due to the recursive nature of blocks 138, 142 below, in the subframes produced by those blocks.) Since the bandwidth request set is guaranteed preferably by ATM admission control to be feasible for frame size N, if N=1, at most one request exists in the set for any given input or output port, and such a request must be for a bandwidth of one cell per frame. (The same is true for subframes having a single slot, i.e., N=1, which is achieved by assuring that set splitting is performed in such a way as to guarantee that the subrequest sets will be feasible for their subframes.)

As a result, for N=1, block 134 can generate a single-slot schedule S, comprising an allocation of all positive-bandwidth (i.e., bandwidth one) flows in set B (or subrequest set B1 or B2) to the single available slot in the (sub)frame.

For a frame size greater than unity, schedule computing method 130 performs several steps, starting with block 136. That block splits set B into subrequest sets and the frame into a like-number of subframes. Block 136 is preferably implemented using a splitting method 200 shown in FIG. 6, described below, which splits the set B into exactly two parts, B1 and B2, and splits the frame into equal sized subframes of size N/2. In other embodiments, the splitting step may divide the set and frame into some other number of parts, e.g., three or four.

Block 136 divides set B in a manner that preferably provides the subrequest sets B1, B2 with the following properties:

1a) For each flow f in subrequest set B1 (or B2), the input and output ports for the flow f are the same in subrequest set B1 (or B2) as in set B, 1b) For each flow f in set B, the bandwidth of flow f in subrequest set B1 and the bandwidth of flow f in subrequest set B2 sum to the bandwidth of flow f in set B, 1c) For each flow f in set B, the bandwidth of flow f in subrequest set B1 differs by at most one cell/subframe from the bandwidth of flow f in subrequest set B2, 1d) In each subrequest set B1 and B2, as in request set B, there is at most one request for any given flow, 1e) Any flow that has a request in subrequest set B1 or subrequest set B2 also has a request in request set B, 1f) For each input i, the load on input i specified by subrequest set B1 differs by at most one cell from the load on input i specified by subrequest set B2, and 1g) For each output o, the load on output o specified by the subrequest set B1 differs by at most one cell from the load on output o specified by subrequest set B2, In all of the foregoing properties, the bandwidth of a flow f in a request set B (or in subrequest set B1 or B2) is equal to the bandwidth of the request for flow f in that request set if one exists, and otherwise is equal to a bandwidth of zero. Moreover, the per port load specified by a set equals the aggregate number of cells per frame for that port specified by requests in the set.

The schedule computing method 130 next produces schedules S1, S2 for the respective subrequest sets B1, B2. Specifically, block 138 produces an (N/2)-frame schedule S1 for subrequest set B1, preferably using this same schedule computing method 130 recursively, with "N" assuming a value in each successive recursion of the prior value of N divided by two. Analogously, block 142 produces an (N/2)-frame schedule S2 for subrequest set B2, preferably using again this same schedule computing method 130 recursively, with "N" assuming a value in each successive recursion of the prior value of N divided (in this illustrative embodiment) by two. In implementing blocks 138 and 142 during each recursion, block 132 performs its test, block 136 splits the respective subrequest sets into successively smaller subrequest sets "B1" and "B2", and splits the frame or subframe "N" into successively smaller subframes, and blocks 138 and 142 compute schedules for each new subrequest set, until the new subframe size equals unity and block 134 yields appropriate schedules S1 and S2 for the original subrequest sets B1 and B2. For example, in the course of scheduling for a frame size of 1024 slots, the schedule computing method 130 will produce 1024 different subframes of size one, i.e., 1024 individual slots, and thus 1024 single-slot schedules. Block 144 appends the single-slot schedules S1 and S2 corresponding to subrequest sets B1 and B2 resulting from the recursive implementations of method 130 to generate a schedule S for the set B.

(iii) Method 200 for Splitting Requests

Figure 6:
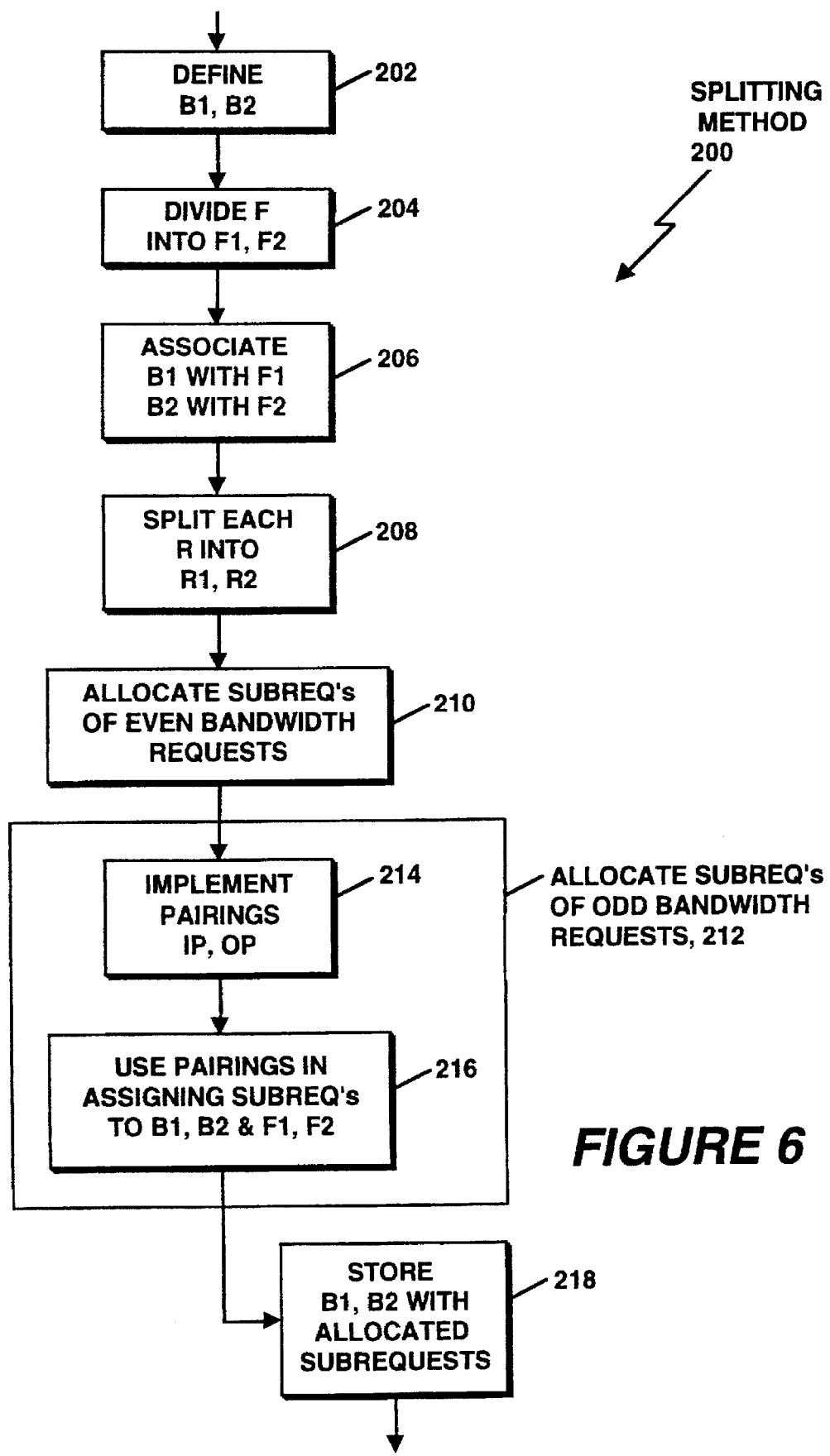
FIG. 6 is a block diagram of a splitting method in accordance with a preferred implementation of block 136 of FIG. 5.

FIG. 6 illustrates a preferred method 200 for splitting the request sets and thus implementing block 136 of FIG. 5. Block 202 defines a number of (e.g., two) subrequest sets B1 and B2 that initially are empty, and block 204 splits the frame F into the same number of subframes F1, F2 of preferably equal size. Then, block 206 associates each of the sets B1 and B2 with a different one of the subframes F1, F2. For example, a first subrequest set B1 can be associated with a first subframe F1 and a second subrequest set B2 with a second subframe F2, or vice versa.

Block 208 divides each request r in set B into a number of (e.g. two) subrequests r1, r2 "having" (i.e., specifying or requesting) equal or approximately equal bandwidths. Specifically, the subrequests r1, r2 have the following properties:

2a) Subrequests r1 and r2 have the same flow f, input port and output port as request r, 2b) A first of the subrequests (r1) has a bandwidth that is one half of the bandwidth specified by request r, rounded-down to an integer if the bandwidth of the request r is odd, and 2c) A second of the subrequests (r2) has a bandwidth that is one half of the bandwidth specified by request r, rounded-up to an integer if request r's bandwidth is odd.

Block 210 subrequests of even-bandwidth requests to the subrequest sets B1, B2 and associated subframes F1, F2 on an arbitrary basis, e.g., r1 to B1, F1 and r2 to B2, F2 or vice versa. (Any subrequest r1, r2 of bandwidth zero may be ignored instead of being included in either set B1 or B2.) Any such allocation of the equal-bandwidth subrequests r1, r2 to subrequest sets B1, B2 will make subrequest sets B1 and B2 satisfy the conditions 1a) through 1g), given above.

If the bandwidths of the subrequests are not equal, subrequest r2 will have a bandwidth that is greater than or less than subrequest r1 by one cell per frame. Block 212 allocates subrequests of odd-bandwidth requests 212. Any subrequest r1, r2 of bandwidth zero may be ignored instead of being included in either set B1 or B2. While any allocation of the unequal-bandwidth subrequests r1, r2 to subrequest sets B1, B2 will make subrequest sets B1 and B2 satisfy the conditions 1a) through 1e) given above, conditions 1f) and 1g) can only be met if the following requirements are met:

3a) For each input port i, the numbers of odd-bandwidth requests for input port i whose larger subrequests are allocated to subrequest sets B1 and B2 differ by at most one, and 3b) For each output port o, the numbers of odd-bandwidth requests for output port o whose larger subrequests are allocated to subrequest sets B1 and B2 differ by at most one.

To meet these requirements, block 214 pairs off the unequal-bandwidth subrequests with each other in a special manner to form "input pairing" IP and "output pairing" OP. Input and output pairings IP, OP are sets of unordered pairs of bandwidth requests. If the pair {b, c} is in IP, b and c are "input partners"; if the pair {d, e} is in OP, d and e are said to be "output partners."

The input pairing satisfies preferably the following properties:

4a) Each bandwidth request has at most one input partner, but some requests may have no input partner, 4b) No bandwidth request is its own input partner, 4c) Input partners use the same input port, and 4d) There is at most one request for each input port that has no input partner.

Input pairing is preferably implemented in a straight forward manner by simply pairing off as-yet-unpaired requests with matching input ports until there is at most one unpaired request left for each input port.

Similarly, output pairings are constructed such that

5a) Each bandwidth request has at most one output partner, but some requests may have no output partner, 5b) No bandwidth request is its own output partner, 5c) Output partners use the same output port, and 5d) There is at most one request for each output port that has no output partner.

The pairings of block 214 can be implemented incrementally: each time an odd-bandwidth flow is considered, a check is made to see whether any previously considered and as-yet-unpaired request has the same input port (and/or output port); if so, that new pair is added to the input pairing list.

With the pairings completed, block 216 can allocate the unequal-bandwidth subrequests r1, r2 to subrequest sets B1 and B2 so that any two requests r and s paired with each other in IP or OP have their larger subrequests r1, s1 assigned to different subrequests sets B1, B2, thus meeting the above-given conditions 3a) and 3b). In other words, whenever a request r has its larger subrequest included in subrequest set B1, request r's input and output partners, if any, have their larger subrequests allocated to the complementary subrequest set B2, and vice versa. Moreover, whenever the larger subrequest of request r is allocated to subrequest set B1, the smaller subrequest of the request is allocated to the complementary subrequest set B2, and vice versa, whenever the larger subrequest of request of request r is allocated to subrequest set B2, the smaller is allocated to subrequest set B1. Accordingly, the steps of block 216 is performed in interleaved fashion for each of the pairings.

A preferred implementation of block 216 for allocating unequal-bandwidth subrequests to the sets can be described as follows: First, choose a request r (if any remain) whose subrequests are not yet allocated. Allocate the r's subrequests r1, r2 arbitrarily to B1 and B2 respectively. If r has an output partner s, then allocate s1 and s2 in the opposite way (so that s1 goes in the same subrequest set as r2), allocate the subrequests of s's input partner t, if any oppositely to those of s and so on, alternately tracing input and output partners and alternately allocating the larger subrequests to B1, B2, until either a request z is found that has no partner, or until a request z is found whose input partner is r. In the case where z is an input partner of r, it will always be true (since getting from r to z involved considering output and input pairings alternately, and therefore took an odd number of steps, counting the step from r to s as the first) that z and r will have had their larger subrequests allocated to different subframes. In the case that the final request z is not the input partner of r, allocate the subrequests of r's input partner q (if any) oppositely to those of r, allocate the subrequests of q's output partner p, if any, oppositely to those of q, etc., until no partner is found. If not all the subrequests are yet allocated, chose another request r' with unallocated subrequests, follow the same procedure with r' as a starting point, and continue in this manner until all the subrequests are allocated to B1, B2. Section D, below, presents a detailed example.

The resulting subrequest sets B1, B2 can then be stored, as indicated in block 218. The foregoing allocation technique produces subrequest sets B1, B2 having subrequests r1, r2 that meet the requirements noted above. As a result, the bandwidths of subrequest sets B1 and B2 will differ by at most one, and the resulting schedule S for these subrequest sets can exhibit a property called "smoothness", as described in Section (E) below.

D) ILLUSTRATIVE PRACTICE

FIGS. 7–9 provide an illustrative practice of methods 130, 200, in which bandwidth request set B of FIG. 7 is to be split into subrequest sets B1, B2, with subrequests r1, r2 for each request r allocated between the subrequest sets. The bandwidth requests for f4 and f11 are even, so subrequest sets B1 and B2 are each assigned requests for half the bandwidth, as given in Table 4.

TABLE 4

| flow id | input port | output port | Bandwidth in set B1 | Bandwidth in set B2 |
| --- | --- | --- | --- | --- |
| f4 | 1 | 4 | 6/2 = 3 | 6/2 = 3 |
| f11 | 3 | 4 | 2/2 = 1 | 6/2 = 3 |

This leaves set B's odd-bandwidth requests to consider, namely, f1–f3, f5–f10, and f12–f14.

Each odd-bandwidth request r is divided into two subrequests r1, r2 whose bandwidths differ by one. For example, the request for flow f1 has bandwidth 9; its subrequests will have bandwidths 4 and 5. Certain requests have their larger subrequests assigned to subrequest sets B1 and others have their larger subrequests assigned to subrequest sets B2. In order to determine which are assigned to subrequest set B1 and which to subrequest set B2, input and output pairings are constructed.

(To avoid cumbersome circumlocutions, in the next few paragraphs, the designation "flow f" or sometimes just "f" shall mean the request for flow f within a particular bandwidth request set.)

First, input pairing will be explained. Notice that flows f2 and f2 use the same input port, in_1, so they can be paired. Flow f3 is now the only remaining flow using in_1, so it must go unpaired. Similarly, flows f5 and f6 can be paired, leaving f7 unpaired. Input port in_3 is requested by four flows, which are grouped into two pairs, {f8, f9} and {f10,f12}. Finally, the two requests for in_4 are paired with each other. The final input pairing is IP={{f1, f2}, {f5, f6}, {f8, f9}, {f10, f12}, {f13, f14}}.

Now, output pairing will be explained. Output port out_1 is used by four flows, f1, f5, f8, f9, which are grouped into a first pair [f1, f5] and a second pair [f8, f9]. Only two flows, f2 and f6, use output port 2, therefore, those two flows can be paired with each other. Flows f3 and f7 can be paired since they share output port out_3. Since flow f10 is the only remaining flow requesting out_3, it remains unpaired. Similarly, f12 and f13, which both use output port out_4, are paired leaving f14 unpaired, since it is the only remaining flow using out_4. The final output pairing is:

OP={{f1, f5}, {f8, f9}, {f2, f6}, {f3, f7}, {f12, f13}}.

FIG. 8 illustrates input and output pairings IP and OP constructed as described above, in which the bandwidth requests for different flows are connected into chains and cycles. Generally speaking, the method of the invention traverses each chain and cycle, assigning the larger subrequests alternately to subrequest sets B1 and B2, and the smaller requests to the complimentary subrequest sets B2, B1. The larger subrequests for flows f1, f6, f8, f3, f10, and f13 can be assigned to subrequest set B1, and the smaller for each to subrequest set B2; likewise, the larger subrequests for flows f2, f5, f9, f7, f12, and f14 can be assigned to subrequest set B2, and the smaller to subrequest set B1.

Combining the subrequests of the odd requests with the subrequests of even requests (already discussed) yields the allocation to subrequest sets B1 and B2 shown in FIG. 8. Note that the load on each input and output port is split as equally as possible (i.e., within one cell of equally) between the two subframes.

For example, the total load on input port in_1 in the original bandwidth request set is 9+1+11+6=27 cells per frame (due to flows f1, f2, f3, f4). As a result of practicing the invention, the total load on that input port for subrequest set B1 is 5+0+6+3=14 cells, and, for subrequest set B2, 4+1+5+3=13 cells. Similarly, the load on output port out_1 (due to flows f1, f5, f8, and f9) is 9+5+13+5=32 cells in B and 16 cells each in B1 and B2. The invention's splitting step divides subrequest set B1 into two subrequest sets, e.g., B3, B4, each specifying a load 14/2=7 cells per frame for port in_i and a load of 16/2=8 cells per frame for output port out_1, and so on. Similarly, subrequest set B2 can be divided into two subrequest sets, e.g., B5, B6, each specifying a load of 16/2=8 cells per frame for output port out_1, and where one subrequest set has a load of (13+1)/2=7 cells per frame input for port in_1 and the other subrequest set has load (13-1)/2=6 cells per frame for in_1.

Since no port has a load greater than thirty-two cells per frame in set B, five levels of recursive splitting will split set B into 32 subrequest sets such that no port has a load greater than a single cell per frame in any single subrequest set.

Accordingly, all the requests in each of the resulting subrequest sets can be satisfied by the switch 32 during a single time slot. The schedule entailing the allocation of these subrequest sets to the time slots is legal and exhibits the aforementioned approximately uniform distribution of slots within the frames, thereby constituting a smooth schedule.

E) DEGREE OF SMOOTHNESS AND SCHEDULING DISCREPANCY

"Smooth" schedules have time slots for each flow that are approximately uniformly distributed throughout the duration of the scheduling frame. For a more quantitative characterization of the meaning of that expression, consider a situation involving a frame size of N time slots per frame, and a flow f with a bandwidth of b cells per frame. Perfect smoothness can be defined as follows: out of any interval I, consisting of an integer number |I| of consecutive time slots, exactly |I|*b/N time slots would be scheduled for flow f. Typically, this ideal cannot be achieved exactly, if only because slots are discrete and |I|*b/N might not be an integer.

A "scheduling discrepancy" for flow f over interval I can be defined as the absolute value of the difference between |I|*b/n and the actual number of time slots scheduled for flow f during interval I. Scheduling discrepancy is a measure of smoothness, in that it indicates variations from perfect smoothness.

If no two flows use the same input or the same output, it would be possible to minimize the scheduling discrepancies for all flows simultaneously, producing a schedule in which the maximum scheduling discrepancy for any flow over any interval was less than one cell. Given a bandwidth request that includes conflicting flows, such results are not necessarily possible.

The splitting step used at each stage of recursion as described above for method 100 splits the bandwidth request set into subrequest sets subject to the following constraint: The bandwidths of any flow f in subrequest sets B1 and B2 differ by at most one.

The application of this constraint guarantees to produce a schedule in which the maximum scheduling discrepancy of any flow over any interval is no more than $((2/3)*\log\_2(N))+1/3$, where N is the total number of time slots per frame (a power of 2), and "log_2" denotes the base-2 logarithm.

For example, with a frame size of 1024, the maximum scheduling discrepancy for any flow over any interval would be no more than seven slots. Moreover, this bound applies even if the schedule for a flow is recomputed from frame to frame (because of other flows being added to or deleted from the bandwidth request set) and the intervals in question may span such schedule recomputations. For flows whose bandwidths are small relative to the frame size and/or whose bandwidths are integer multiples of powers of two, the maximum discrepancies may be even smaller.

Method 100 does not necessarily minimize the maximum scheduling discrepancies of all flows; however, the discrepancies produced are typically smaller, and may be considerably smaller, than the worst-case discrepancies for schedules that are legal but that satisfy no additional smoothness requirements.

For example, consider a 1024-slot scheduling frame (N=1024) and a flow f with a bandwidth of 512 cells per frame (b=512). If all the scheduled slots for flow f are grouped together in the first half of the frame, the first and last halves of the frame each have scheduling discrepancies of N/4=256 cells. If rescheduling is possible from one frame to the next, an interval of 1024 slots that includes the last half of one frame and the first half of the next frame may include as many as 1024 and as few as zero scheduled slots for flow f, giving a maximum scheduling discrepancy of 512 cells.

F. OTHER FEATURES AND EMBODIMENTS i) Smooth Scheduling on a Flow Basis

As described above, method 100 (including the schedule computing method 130 and the splitting method 200) may treat all flows from a given input port to a given output port as a single, aggregated flow.

To illustrate, consider the example given in FIGS. 7–9. In the request set B from the above example, flows f8 and f9 both go from input port in_3 to output port out_1. For the purpose of determining the set of time slots during which port in_3 will be connected to port out_1, these two flows can be treated as a single flow of bandwidth 13+5=18. As a result, method 100 (including schedule computing method 130 and splitting method 200) produces a schedule in which eighteen time slots are reserved for flows from port in_3 to port out_1. These eighteen time slots are distributed in the scheduling frame as follows: 9 slots in each half-frame, 4 or 5 in each quarter-frame, 2 or 3 in each eighth-frame, and so on.

The scheduled slots resulting from practicing method 100 can be allocated among the individual flows in such a way that the smoothness criterion is satisfied for each individual flow.

The allocation of the slots to the individual flows from an input port i to an output port o can be done by a recursive process analogous to the recursive process of method 130, as illustrated in FIGS. 5 and 6. The bandwidth request r for each flow f from i to o is split into two subrequests r1, r2, one of which is assigned to each half of the (sub) frame. If the bandwidth of r is even, the bandwidths of r1 and r2 are equal, so the assignment of r1 and r2 to the sets B1, B2 can be made arbitrarily. If the bandwidth of r is odd, the bandwidth of r1 will be greater by one than that of r2. If the total bandwidth from i to o is even, exactly half of the odd-bandwidth requests must have their larger subrequests assigned to each subframe. If the total bandwidth from i to o is odd, one of the subframes will have one more slot allocated to traffic from i to o than the other subframe has. The number of odd-bandwidth requests that have their larger subrequests allocated to the subframe with the extra slot must be greater by one than the number having their larger subrequests allocated to the other subframe.

This allocation of slots to individual flows, once slots have already been allocated to input-output pairs, can be done independently for each input-output pair, and hence is amenable to parallelism.

ii) Use of Parallel processing to Compute Schedules

Parallelism can be achieved by employing multiple processors, e.g., multiple LCP's, for performing the method 100, i.e., parallel processing. For example, once the initial bandwidth request set B has been split into subrequest sets B1 and B2 for the first and second subframes, the two subframes can be scheduled independently. The top level of splitting can be done on a single processor and one or more of the resulting subsets communicated to another processor (or to other processors) internal or external to the LCP 70 (FIG. 3) so that the two subframes can be scheduled in parallel.

If communication costs are high compared to computation costs, the top level of splitting can be computed independently (but identically) by two different processors, each of which then schedules only one of the subframes. Similarly, larger numbers of smaller subframes can be scheduled in parallel, with the top levels of splitting either being computed in multiple places or computed centrally and distributed.

Allocation of slots to specific flows, once the slots have already been allocated to input-output pairs, can be done independently for each input-output pair, and hence is highly amenable also to parallelism.

iii) Smooth Scheduling on a Per-Link Basis

It was mentioned earlier that a single output of a switch 32 (FIG. 3) may be used to drive a plurality of communication links that each run at lower bandwidths than the per-port bandwidth of the switch. In such cases, it is desirable to have the aggregate bandwidth to any particular output link smoothly spread out over the scheduling frame in order to decrease both the amount of output buffering required and the amount of time data spends in output buffers 82 and 83 (FIG. 3).

Method 100 can be modified to achieve such per-output-link smoothing by adding one further requirement to the splitting step 136 (FIG. 4). Recall that the splitting step 130 for method 100 satisfied the constraints set forth above as properties (1a) through (1g). For smooth scheduling for per-output-link smoothness, an additional requirement is imposed:

1h) For each output link L, the load on output link L specified by subrequest set B1 differs by at most one cell from the load on the output link specified by subrequest set B2.

This constraint can be satisfied by changing the way that output pairings are computed in block 212 of the splitting method 200 (FIG. 6). For per-link smoothness, that block 212 can first perform pairing of requests for identical output links until each output link has at most one unpaired request, and then pairing as-yet-unpaired requests for identical output ports until each output port has at most one unpaired request. This pairing technique guarantees that the following condition will be satisfied in addition to (5a)–(5d):

(5e) For any output link 1, all but at most one of the requests that use link 1 have as output partners other requests that use link 1. The remaining request, if any, might either have no output partner or have an output partner that uses a different output link.

The resulting schedule will be such that the slots assigned to the aggregate of flows using any given output link will be approximately uniformly distributed over the duration of each frame.

iv) Smooth Scheduling for Switches with Limited Channels

For a crossbar switch, the number of separate cells that can be transferred from input ports to output ports during a single time slot is limited by the number of input ports or the number of output ports, whichever is less. For other kinds of switches, such as those based on shared buses, there may be a smaller bound on the number of cells that can traverse the switch simultaneously, and thus on the number of flows that can be scheduled into any given slot.

Suppose that a switch can carry at most k cells simultaneously. Any bandwidth request set that requires more than N*k cells to be transmitted during an N-slot scheduling frame is infeasible. On the other hand, if the total bandwidth requested is at most N*k cells per frame, and if the total bandwidth to any input port or output port is at most N cells per frame (and if the total bandwidth to any output link does not exceed the capacity of that link), it is always possible to find a schedule that uses each slot for at most k flows, in addition to satisfying all the legality and smoothness properties discussed earlier. All that is required is to make the splitting step 136 achieve one additional condition: The aggregate load for all flows in subrequest set B1 differs from the aggregate load for all flows in subrequest set B2 by at most one.

This condition can be achieved by replacing conditions (4c), (4d), (5c), and (5d) with the following (4c') For each input port i there is at most one flow from input port i whose input partner uses a different input port.

(4d') There is at most one flow with no input partner.

(5c') For each output port o there is at most one flow from output port o whose input partner uses a different output port.

(5d') There is at most one flow with no output partner.

An input (or output) pairing satisfying the original conditions can be extended to satisfy the modified conditions by simply pairing off flows having no input (resp., output) partner until at most one such flow is left.

For example, consider the bandwidth request set in FIG. 7. By extending the pairing in FIG. 8 as described above, the pairing shown in FIG. 10 is obtained.

The resulting pairing gives a graph consisting of a collection of even-length cycles plus at most a single simple path (in the example above there are only cycles), and results in an allocation of subrequests to subframes such that the aggregate bandwidths of the subrequest sets differ by at most one cell.

The bandwidth request set in FIG. 7 loads no input or output port with more than 32 cells per frame, and thus can be scheduled in 32 slots on a switch that allows all inputs and all outputs to be in use during a single slot (so that four cells can be transmitted simultaneously). If the switching fabric were limited to two active channels during any slot, 32 slots would be inadequate, since the aggregate bandwidth request is 108 cells per frame, which is more than 32 slots per frame times 2 cells per slot. However, scheduling into a 64-slot frame would be feasible using the input- and output-pairing technique described above. Since the aggregate bandwidth is divided equally, within one cell, at each splitting step, the aggregate bandwidth request of 108 cells in a 64-slot frame would be split into subrequests of 54 cells per 32-slot subframe, 27 cells per 16-slot subframe, at most 14 cells per 8-slot subframe, at most 7 cells per 4-slot subframe, at most 4 cells per 2-slot subframe, and finally at most 2 cells per single slot, as required by the limited-channel nature of the switch.

It should be noted that there are considerations in some applications that favor splitting of aggregate bandwidth as unequally as possible, consistent with legality, because such an approach may provide better availability of input and output ports for VBR traffic. This too can be achieved using the principles the invention described hereinabove.

v) Splitting Techniques

Before discussing other splitting techniques, it might prove useful to summarize the above-described technique. In the above-discussion, particular emphasis was placed on the case where the frame (or the current subframe) is to be divided into two subframes of equal size. By finding appropriate input and output pairings, certain bandwidth requests (for individual flows or aggregates of flows) can be divided nearly equally (equally within one cell per frame) among the two subrequest sets. Specifically, near equal divisions can be achieved of any or all of the following load types: (1) for each flow, f, the per-(sub) frame bandwidth request for f, (2) for each input port i, the aggregate per-(sub) frame bandwidth requested for flows from i, (3) for each output port i, the aggregate per-(sub)frame bandwidth requested for flows to i, (4) for each output link 1, the aggregate per-(sub) frame bandwidth requested for flows to 1, (5) for each input port i and output port o, the aggregate per-(sub)frame bandwidth requested for flows from i to o, (6) for each input port i and output link o, the aggregate per-(sub) frame bandwidth requested for flows from i to 1, (7) the aggregate per-(sub) frame bandwidth requested by all flows.

Achieving equal-within-one-cell splitting for load types (2) and (3) enables the system to guarantee that the subrequest sets will be feasible for their subframes, provided that the original bandwidth request set is feasible. Achieving equal-within-one-cell splitting for load type (1) can reduce the input buffering requirements of some flows and reduce latency due to input buffering. Achieving equal-within-one cell splitting for load type (4) limits output buffering requirements and reduces output latency for switches with links that are slower than the switch ports. By achieving equal-within-one-cell splitting for load type (5) (or for load type (6) if we are also interested in load type (4)) in a first pass, we may save time and working space, while allowing equal-within-one-cell splitting for load type (1) to be achieved in a later computation step, possibly employing parallelism. Achieving equal-within-one-cell splitting for load type (7) is useful for scheduling for switch fabrics with limited channels.

The splitting need not always be equal within one cell. So long as load types (2) and (3) are split such that no port is over-committed, and so long as load type (7) is split such that the aggregate bandwidth requested in any subframe is less than the subframe length times the number of channels, the result will be a legal schedule. However, the more unequally load types (1) and (4) are split, the less smooth the resulting schedule will be, and thus the larger the buffering requirements and latency bounds will be.

To perform smooth scheduling of a frame (or subframe) whose length is an odd number of slots, say 2m+1, an alternative technique proceeds as follows: (a) Divide the (sub) frame into three subframes, one consisting of a single slot and the others having m slots each. (b) Schedule sufficiently many non-conflicting flows into the one-slot subframe to guarantee that the remaining bandwidth requests can be feasibly scheduled in 2m frames. (One way to schedule the one-slot subframe is to use a conventional method to find any legal schedule—without regard for smoothness—for the bandwidth request set in 2m+1 slots then choose any slot out of that schedule and use the portion of the schedule corresponding to that chosen slot. Since only one slot out of the schedule is needed, it will generally not be necessary, depending on the scheduling method chosen, to compute a complete schedule.) (c) Split the remaining bandwidth request set between the two m-slot subframes so that any desired combination of (1)–(7) are split equally within one cell. (d) It may be helpful, particularly if m is odd, to recombine the subrequest set for one of the m-slot subframes with the subrequest set for the single slot before going on to the next level of recursive splitting.

The smoothness guarantees achieved with this method are generally not quite so good as those achieved when each splitting step produces two equal-length subframes, but they are generally better than the worst case situations that can arise when schedules are constructed entirely without regard for smoothness.

Instead of splitting a (sub) frame into two equal-length subframes, a method could be implemented that splits it into some larger number of equal-length subframes. It is always possible to split a bandwidth request set into k parts (where "k" is an integer) such that any or all of load types (1)–(7) are split equally within one cell among the subrequest sets. An illustrative embodiment for achieving this can be described as follows: (a) split the request set arbitrarily into k subrequest sets; (b) if all the bandwidth requests (for flows or particular aggregates of flows) that were to be split equally within one cell have been so split, the technique is completed; and otherwise, (c) choose two of the k subrequest sets whose bandwidth requests for some relevant flow or aggregate of flows differ by more than one cell, add those two subrequest sets together, split the resulting request set dividing all relevant bandwidth requests equally within one cell, and return to step (b). This process eventually terminates giving a k subrequest sets such that each of the desired bandwidths is split equally within one cell. The case k=3 is of particular interest, since it results in smoothness guarantees slightly better than those for binary splitting.

Just as a method could split a (sub) frame into two equal subframes plus a single slot, another method could can split a subframe into k equal subframes and from one up to k−1 single slots. Also, at each recursive splitting step, the method could choose the kind of splitting (into two equal parts, into three equal parts, into two equal parts plus an extra slot that might or might not be recombined with one of the two equal parts, etc.) independently.

The scheduling methods described so far apply to "unicast" traffic, where each flow is from a single input port to a single output port. To share a switch between unicast traffic and multicast or broadcast traffic (where a flow may go from a single input port to more than one output port, and perhaps to all output ports), a method can be implemented that can schedule the multicast/broadcast traffic into some subset of the slots in each frame, preferably spreading those slots nearly uniformly through the duration of the frame, and then schedule the unicast CBR traffic smoothly into whatever slots remain, using any of the splitting methods described above. The output buffering requirements will then depend on the per-output-link smoothness of multicast/broadcast schedule as well as that the unicast schedule.

The terms and expressions that have been employed herein are used as terms of description and not of limitation. Accordingly, the invention in its broader aspects is not limited to the specific details, preferred and alternative embodiments, and illustrative examples shown and described herein. Departures may be made from such details without departing from the spirit or scope of the invention.

What is claimed is:

1. A network switching system comprising:
    A) a switch including a plurality of input ports, a plurality of output ports, and connection means for connecting selectively said input ports to said output ports during each of a plurality of sequential time slots for forwarding a plurality of cells thereacross, said cells being grouped together into a plurality of flows, each said flow including destination information, each said time slot being of a duration sufficient for forwarding at least one of said cells from one of said input ports to one of said output ports, said time slots comprising a plurality of frames, each said frame comprising a number ("N") of said time slots;
    B) signal generating means coupled with said switch for generating set-up signals responsive to a plurality of schedules for controlling said switch connection means to connect together a number of pairs of input ports and output ports during said time slots; and
    C) processor means coupled with said signal generating means for generating said schedules responsive to a plurality of bandwidth requests, each said bandwidth request corresponding to one of said flows and comprising a request for forwarding of a specified number of cells per frame from a specified input port to a specified output port, said processor generating a plurality of subrequests by dividing each said bandwidth request into a number of subrequests, each said schedule comprising a plurality of sub-schedules for allocating said subrequests to each of N slots in such manner as to provide an approximately uniform temporal distribution, for each said flow, of cells of said flow forwarded across said switch over the duration of each said frame during which said set-up signals are responsive to said schedule.

2. The network switching system in accordance with claim 1, wherein said output ports are connected to a plurality of output communication links, and said processor means generates each said schedule in such manner as to provide an approximately uniform temporal distribution, for each of a number of said output communication links, of cells of the aggreagte of said flows forwarded across said switch to said output communication link over the duration of each said frame during which said set-up signals are responsive to said schedule.

3. The network switching system in accordance with claim 2, wherein said processor means generates each said schedule in such manner as to provide an approximately uniform temporal distribution of the aggregate of said cells of said flows forwarded across said switch over the duration of each said frame during which said set-up signals are responsive to said schedule.

4. The network switching system in accordance with claim 1, wherein said processor means generates each said schedule in such manner as to provide an approximately uniform temporal distribution of the aggregate of said cells of said flows forwarded across said switch over the duration of each said frame during which said set-up signals are responsive to said schedule.

5. A network switching system comprising:
    A) a switch including a plurality of input ports, a plurality of output ports, and connection means for connecting selectively said input ports to said output ports during each of a plurality of sequential time slots for forwarding a plurality of cells thereacross, said cells being grouped together into a plurality of flows, each said flow including destination information, each said time slot being of a duration sufficient for forwarding at least one of said cells from one of said input ports to one of said output ports, said time slots comprising a plurality of frames, each said frame comprising a number ("N") of said time slots;
    B) signal generating means coupled with said switch for generating set-up signals responsive to a plurality of schedules for controlling said switch connection means to connect together a number of pairs of input ports and output ports during said time slots; and
    C) processor means coupled with said signal generating means for generating said schedules responsive to a plurality of bandwidth requests, each said bandwidth request corresponding to one of said flows and comprising a request for forwarding of a specified number of cells per frame from a specified input port to a specified output port, said processor generating a plurality of subrequests by dividing each said bandwidth request into a number of subrequests, each said schedule comprising a plurality of sub-schedules for allocating said subrequests to each of N slots in such manner as to provide an approximately uniform temporal distribution, for each of said input ports, of the aggregate of cells of said flows forwarded across said switch from said input port over the duration of each said frame during which said set-up signals are responsive to said schedule.

6. A network switching system comprising:
    A) a switch including a plurality of input ports, a plurality of output ports, and connection means for connecting selectively said input ports to said output ports during each of a plurality of sequential time slots for forwarding a plurality of cells thereacross, said cells being grouped together into a plurality of flows, each said flow including destination information, each said time slot being of a duration sufficient for forwarding at least one of said cells from one of said input ports to one of said output ports, said time slots comprising a plurality of frames, each said frame comprising a number ("N") of said time slots;
    B) signal generating means coupled with said switch for generating set-up signals responsive to a plurality of schedules for controlling said switch connection means to connect together a number of pairs of input ports and output ports during said time slots; and
    C) processor means coupled with said signal generating means for generating said schedules responsive to a plurality of bandwidth requests, each said bandwidth request corresponding to one of said flows and comprising a request for forwarding of a specified number of cells per frame from a specified input port to a specified output port, said processor generating a plurality of subrequests by dividing each said bandwidth request into a number of subrequests, each said schedule comprising a plurality of sub-schedules for allocating said subrequests to each of N slots in such manner as to provide an approximately uniform temporal distribution, for each of said output ports, of the aggregate of cells of said flows forwarded across said switch to said output port over the duration of each said frame during which said set-up signals are responsive to said schedule.

7. A network switching system comprising:

A) a switch including a plurality of input ports, a plurality of output ports, and connection means for connecting selectively said input ports to said output ports during each of a plurality of sequential time slots for forwarding a plurality of cells thereacross and to a plurality of output communication links connected to said output ports, said cells being grouped together into a plurality of flows, each said flow including destination information, each said time slot being of a duration sufficient for forwarding at least one of said cells from one of said input ports to one of said output ports, said time slots comprising a plurality of frames, each said frame comprising a number ("N") of said time slots;

B) signal generating means coupled with said switch for generating set-up signals responsive to a plurality of schedules for controlling said switch connection means to connect together a number of pairs of input ports and output ports during said time slots; and C) processor means coupled with said signal generating means for generating said schedules responsive to a plurality of bandwidth requests, each said bandwidth request corresponding to one of said flows and comprising a request for forwarding of a specified number of cells per frame from a specified input port to a specified output port, said processor generating a plurality of subrequests by dividing each said bandwidth request into a number of subrequests, each said schedule comprising a plurality of sub-schedules for allocating said subrequests to each of N slots in such manner as to provide an approximately uniform temporal distribution, for each of said output communication links, of cells of the aggregate of said flows forwarded across said switch to said output communication link over the duration of each said frame during which said set-up signals are responsive to said schedule.

8. The network switching system in accordance with claim 7, wherein said processor means generates each said schedule in such manner as to provide an approximately uniform temporal distribution of the aggregate of said cells of all said flows forwarded across said switch over the duration of each said frame during which said set-up signals are responsive to said schedule.

9. A network switching system comprising:

A) a switch including a plurality of input ports, a plurality of output ports, and connection means for connecting selectively said input ports to said output ports during each of a plurality of sequential time slots for forwarding a plurality of cells thereacross, said cells being grouped together into a plurality of flows, each said flow including destination information, each said time slot being of a duration sufficient for forwarding at least one of said cells from one of said input ports to one of said output ports, said time slots comprising a plurality of frames, each said frame comprising a number ("N") of said time slots;

B) signal generating means coupled with said switch for generating set-up signals responsive to a plurality of schedules for controlling said switch connection means to connect together a number of pairs of input ports and output ports during said time slots; and C) processor means coupled with said signal generating means for generating said schedules responsive to a plurality of bandwidth requests, each said bandwidth request corresponding to one of said flows and comprising a request for forwarding of a specified number of cells per frame from a specified input port to a specified output port, said processor generating a plurality of subrequests by dividing each said bandwidth request into a number of subrequests, each said schedule comprising a plurality of sub-schedules for allocating said subrequests to each of N slots in such manner as to provide an approximately uniform temporal distribution, for each of said input and output ports, the aggregate of cells of said flows forwarded across said switch from said input port to said output port over the duration of each said frame during which said set-up signals are responsive to said schedule.

10. A network switching system comprising:

A) a switch including a plurality of input ports, a plurality of output ports, and connection means for connecting selectively said input ports to said output ports during each of a plurality of sequential time slots for forwarding a plurality of cells thereacross and to a plurality of output communication links connected to said output ports, said cells being grouped together into a plurality of flows, each said flow including destination information, each said time slot being of a duration sufficient for forwarding at least one of said cells from one of said input ports to one of said output ports, said time slots comprising a plurality of frames, each said frame comprising a number ("N") of said time slots;

B) signal generating means coupled with said switch for generating set-up signals responsive to a plurality of schedules for controlling said switch connection means to connect together a number of pairs of input ports and output ports during said time slots; and C) processor means coupled with said signal generating means for generating said schedules responsive to a plurality of bandwidth requests, each said bandwidth request corresponding to one of said flows and comprising a request for forwarding of a specified number of cells per frame from a specified input port to a specified output port, said processor generating a plurality of subrequests by dividing each said bandwidth request into a number of subrequests, each said schedule comprising a plurality of sub-schedules for allocating said subrequests to each of N slots in such manner as to provide an approximately uniform temporal distribution, for each of said input ports and output communication links, the aggregate of cells of all said flows forwarded across said switch to said input port to said output communication link over the duration of each said frame during which said set-up signals are responsive to said schedule.

11. A network switching system comprising:

A) a switch including a plurality of input ports, a plurality of output ports, and connection means for connecting selectively said input ports to said output ports during each of a plurality of sequential time slots for forwarding a plurality of cells thereacross, said cells being grouped together into a plurality of flows, each said flow including destination information, each said time slot being of a duration sufficient for forwarding at least one of said cells from one of said input ports to one of said output ports, said time slots comprising a plurality of frames, each said frame comprising a number ("N") of said time slots;

B) signal generating means coupled with said switch for generating set-up signals responsive to a plurality of schedules for controlling said switch connection means to connect together a number of pairs of input ports and output ports during said time slots; and C) processor means coupled with said signal generating means for generating said schedules responsive to a plurality of bandwidth requests, each said bandwidth request corresponding to one of said flows and comprising a request for forwarding of a specified number of cells per frame from a specified input port to a specified output port, said processor generating a plurality of subrequests by dividing each said bandwidth request into a number of subrequests, each said schedule comprising a plurality of sub-schedules for allocating said subrequests to each of N slots in such manner as to provide an approximately uniform temporal distribution the aggregate of said cells of all said flows forwarded across said switch over the duration of each said frame during which said set-up signals are responsive to said schedule.

12. In a network switching system comprising a switch including a plurality of input ports, a plurality of output ports, and connection means for connecting selectively said input ports to said output ports during each of a plurality of sequential time slots for forwarding a plurality of cells thereacross, said cells being grouped together into a plurality of flows, each said flow including destination information, each said time slot being of a duration sufficient to forward at least one of said cells from one of said input ports to one of said output ports, said time slots comprising a plurality of frames, each said frame comprising a number ("N") of said time slots; said network switching system further comprising signal generating means coupled with said switch and responsive to a plurality of schedules for generating set-up signals for controlling said switch connection means to connect together a number of pairs of said input ports and output ports during each said frame; a method of generating and implementing each said schedule comprising the steps of:

A) receiving a plurality of bandwidth requests r, s, each said bandwidth request comprising data representing a request for forwarding of a specified number of cells per frame from a specified input port to a specified output port;

B) using a computer for generating a schedule by performing the steps comprising:
i) dividing said bandwidth requests into a plurality of subrequests r1, r2, s1, s2; and
ii) generating a plurality of sub-schedules for allocating said subrequests to each of N slots in such manner as to provide an approximately uniform temporal distribution of said cells of all said flows forwarded across said switch over the duration of each said frame during which said set-up signals are responsive to said schedule; and C) implementing said schedule including the step of controlling said set up signals in response thereto for forwarding said flows across said switch.

13. The method in accordance with claim 12, wherein said output ports are connected to a plurality of output communication links; and step (B) generates each said schedule in such manner as to provide an approximately uniform temporal distribution, for each of said output communication links, of said cells of the aggregate of said flow forwarded across said switch to said output communication link over the duration of each said frame during which said set-up signals are responsive to said schedule.

14. The method in accordance with claim 13, wherein step (B) generates each said schedule in such manner as to provide an approximately uniform temporal distribution of the aggregate of said cells of said flows forwarded across said switch over the duration of each said frame during which said set-up signals are responsive to said schedule.

15. In a network switching system comprising a switch including a plurality of input ports, a plurality of output ports, and connection means for connecting selectively said input ports to said output ports during each of a plurality of sequential time slots for forwarding a plurality of cells thereacross and to a plurality of output links connected to said output ports, said cells being grouped together into a plurality of flows, each said flow including destination information, each said time slot being of a duration sufficient to forward at least one of said cells from one of said input ports to one of said output ports, said time slots comprising a plurality of frames, each said frame comprising a number ("N") of said time slots; said network switching system further comprising signal generating means coupled with said switch and responsive to a plurality of schedules for generating set-up signals for controlling said switch connection means to connect together a number of pairs of said input ports and output ports during each said frame; a method of generating and implementing each said schedule comprising the steps of:

A) receiving a plurality of bandwidth requests, r, s, each said bandwidth request comprising data representing a request for forwarding of a specified number of cells per frame from a specified input port to a specified output port;

B) using a computer for generating a schedule by performing the steps comprising:
i) dividing said bandwidth requests into a plurality of subrequests r1, r2, s1, s2; and
ii) generating a plurality of sub-schedules for allocating said subrequests to each of N slots in such manner as to provide an approximately uniform temporal distribution, for each of said output communication links, of said cells of said flow forwarded across said switch to said output communication link over the duration of each said frame during which said set-up signals are responsive to said schedule; and C) implementing said schedule including the step of controlling said set up signals in response thereto for forwarding said flows across said switch.

16. The method in accordance with claim 15, wherein step (B) generates each said schedule in such manner as to provide an approximately uniform temporal distribution of the aggregate of said cells of all said flows forwarded across said switch over the duration of each said frame during which said set-up signals are responsive to said schedule.

17. In a network switching system comprising a switch including a plurality of input ports, a plurality of output ports, and connection means for connecting selectively said input ports to said output ports during each of a plurality of sequential time slots for forwarding a plurality of cells thereacross, said cells being grouped together into a plurality of flows, each said flow including destination information, each said time slot being of a duration sufficient to forward at least one of said cells from one of said input ports to one of said output ports, said time slots comprising a plurality of frames, each said frame comprising a number ("N") of said time slots; said network switching system further comprising signal generating means coupled with said switch and responsive to a plurality of schedules for generating set-up signals for controlling said switch connection means to connect together a number of pairs of said input ports and output ports during each said frame; a method of generating and implementing each said schedule comprising the steps of:

- A) receiving a plurality of bandwidth requests, r, s, each said bandwidth request comprising data representing a request for forwarding of a specified number of cells per frame from a specified input port to a specified output port;
- B) using a computer for generating a schedule by performing the steps comprising:
  - i) dividing said bandwidth requests into a plurality of subrequests r1, r2, s1, s2; and
  - ii) generating a plurality of sub-schedules for allocating said subrequests to each of N slots in such manner as to provide an approximately uniform temporal distribution, for all said flows, the aggregate of said cells of all said flows forwarded across said switch over the duration of each said frame during which said set-up signals are responsive to said schedule; and
- C) implementing said schedule including the step of controlling said set up signals in response thereto for forwarding said flows across said switch.

18. The method in accordance with claim 17, wherein said output ports are connected to a plurality of output communication links; and step (B) generates each said schedule in such manner as to provide an approximately uniform temporal distribution, for each said flow, of said cells of said flow forwarded across said switch over the duration of each said frame during which said set-up signals are responsive to said schedule.

19. The method in accordance with any of claims 12 through 18, wherein said step of generating subschedules comprises the steps of:

- A) if the frame for the request set comprises a single cell, scheduling all positive bandwidth flows in the request set into the available slot; and
- B) if the frame for the request set comprises more than a single cell, (i) splitting said subrequest set into a number of subrequest sets B1, B2 and said frame into a number of subframes F1, F2; (ii) producing a subschedule S1 for subrequest set B1 and subframe F1 using the steps (A) and (B) hereof; (iii) producing a subschedule S2 for subrequest set B2 and subframe F2 using the steps (A) and (B) hereof; and (iv) appending and storing said subschedules S1, S2.

20. The method in accordance with claim 19, wherein said step of splitting said subrequest set into a number of subrequest sets B1, B2 and said frame into a number of subframes F1, F2 comprises the step of:

- A) defining a first and second subrequest sets B1, B2;
- B) dividing said frame into first and second subframes F1, F2;
- C) associating said first and second subrequests sets B1, B2 with said first and second subframes F1, F2, respectively;
- D) if said subrequests are equal, assigning said subrequests r1, r2 to said subrequest sets B1 and B2, respectively; and
- E) if said subrequests are not equal, implementing pairings I and OP, and assigning subrequests to subsets B1, B2 so that any two of said requests r, s paired with each other in IP or OP have their larger subrequests r1, S2 assigned to different subrequest sets.

* * * * *